(12) United States Patent
Kidokoro et al.

(10) Patent No.: US 7,845,444 B2
(45) Date of Patent: Dec. 7, 2010

(54) HYBRID VEHICLE

(75) Inventors: Teruhisa Kidokoro, Saitama (JP); Kenji Honda, Saitama (JP); Naohisa Morishita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 627 days.

(21) Appl. No.: 11/902,405

(22) Filed: Sep. 21, 2007

(65) Prior Publication Data

US 2008/0076616 A1 Mar. 27, 2008

(30) Foreign Application Priority Data

Sep. 21, 2006 (JP) .............................. 2006-256272

(51) Int. Cl.
*B60K 6/445* (2007.10)
(52) U.S. Cl. .............................. 180/65.235; 180/65.265
(58) Field of Classification Search ............. 180/65.21, 180/65.22, 65.225, 65.23, 65.235, 65.265, 180/65.28, 65.285, 65.6, 65.7, 365; 903/915, 903/917, 921, 922, 923, 940, 941, 942; 477/5, 477/15, 181; 475/5; 290/40 R, 40 A, 40 C
See application file for complete search history.

(56) References Cited

U.S. PATENT DOCUMENTS

| | | | | |
|---|---|---|---|---|
| 5,643,119 | A * | 7/1997 | Yamaguchi et al. ............. | 475/5 |
| 5,775,449 | A * | 7/1998 | Moroto et al. ......... | 180/65.235 |
| 5,788,006 | A * | 8/1998 | Yamaguchi ............ | 180/65.235 |
| 5,856,709 | A * | 1/1999 | Ibaraki et al. ................. | 290/45 |
| 5,943,918 | A * | 8/1999 | Reed et al. ..................... | 74/661 |
| 6,059,059 | A * | 5/2000 | Schmidt-Brucken ..... | 180/65.23 |
| 6,110,066 | A * | 8/2000 | Nedungadi et al. ............. | 475/5 |
| 6,138,784 | A * | 10/2000 | Oshima et al. ........... | 180/65.26 |
| 6,346,062 | B1 * | 2/2002 | Shimabukuro et al. ......... | 477/5 |
| 6,429,541 | B2 * | 8/2002 | Takenaka et al. .......... | 290/40 C |
| 6,540,636 | B2 * | 4/2003 | Amanuma et al. .......... | 475/149 |
| 6,565,473 | B2 * | 5/2003 | Endo et al. ................... | 475/117 |
| 6,603,215 | B2 * | 8/2003 | Kuang et al. .............. | 290/40 C |
| 6,621,175 | B1 * | 9/2003 | Kuroda et al. ............. | 290/40 D |
| 6,644,427 | B2 * | 11/2003 | Schulte .................... | 180/65.25 |

(Continued)

FOREIGN PATENT DOCUMENTS

JP 2942533 B2 6/1999

(Continued)

*Primary Examiner*—Paul N Dickson
*Assistant Examiner*—Jacob Meyer
(74) *Attorney, Agent, or Firm*—Arent Fox, LLP

(57) ABSTRACT

A hybrid vehicle is provided with a first transmission passage for transmitting driving force of an engine to driving wheels and a second transmission passage for transmitting driving force of a driving motor to the driving wheels, and driven by selectively using or in combination of the first transmission passage and the second transmission passage. The hybrid vehicle includes: a first input gear for inputting the driving force of the engine; a second input gear for inputting the driving force of the driving motor; and an idle gear meshed with the first input gear and the second input gear, and transmitting at least one of the driving force of the engine and the driving force of the driving motor toward the driving wheels. The driving force to be input from at least one of the first input gear and the second input gear is transmitted to the driving wheels via the idle gear and the final differential gears.

18 Claims, 12 Drawing Sheets

U.S. PATENT DOCUMENTS

| | | | |
|---|---|---|---|
| 7,028,794 B2 * | 4/2006 | Odahara et al. | 180/65.25 |
| 7,059,435 B2 * | 6/2006 | Niki et al. | 180/65.25 |
| 7,086,977 B2 * | 8/2006 | Supina et al. | 475/5 |
| 7,128,677 B2 * | 10/2006 | Supina et al. | 475/5 |
| 2002/0091034 A1 * | 7/2002 | Nakamori et al. | 477/3 |
| 2004/0220015 A1 * | 11/2004 | Murakami et al. | 477/15 |
| 2005/0246082 A1 * | 11/2005 | Miki et al. | 701/50 |
| 2007/0254776 A1 * | 11/2007 | Wakashiro et al. | 477/181 |
| 2008/0006467 A1 * | 1/2008 | Morishita et al. | 180/365 |

FOREIGN PATENT DOCUMENTS

| | | |
|---|---|---|
| JP | 2004-123060 A | 4/2004 |

* cited by examiner

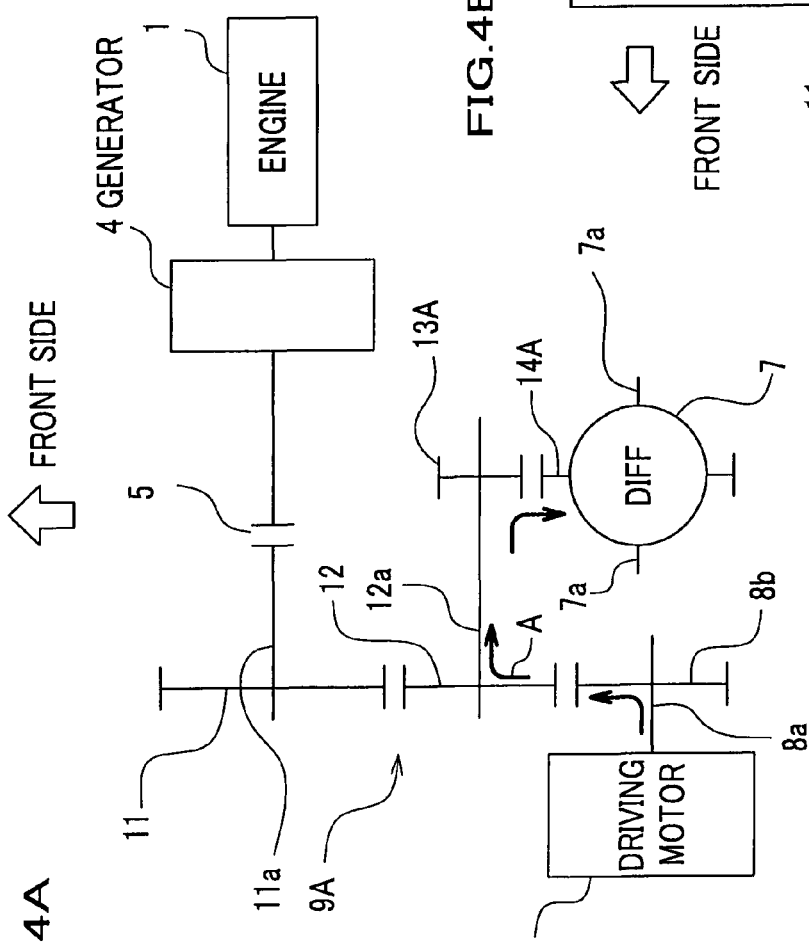
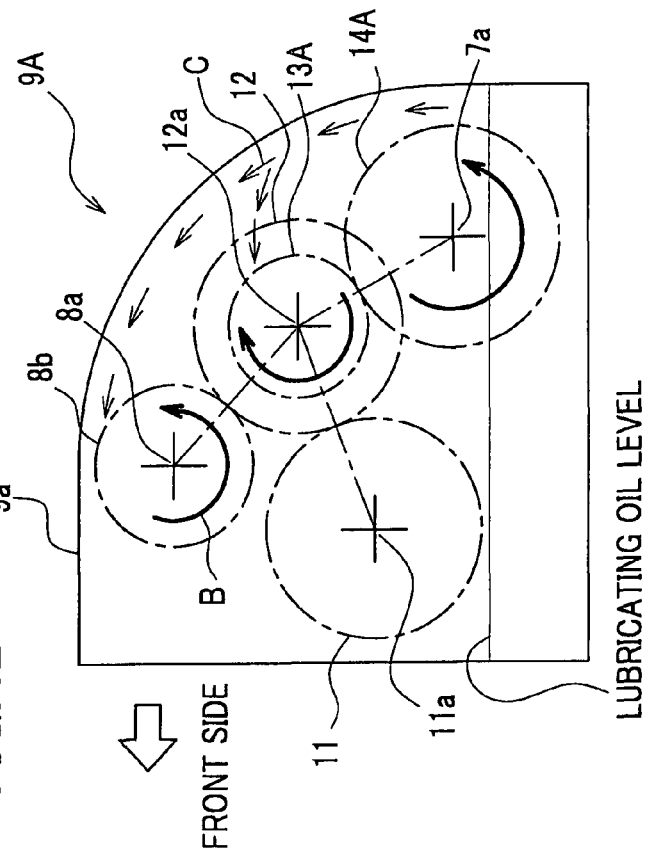
FIG.4A
FIG.4B

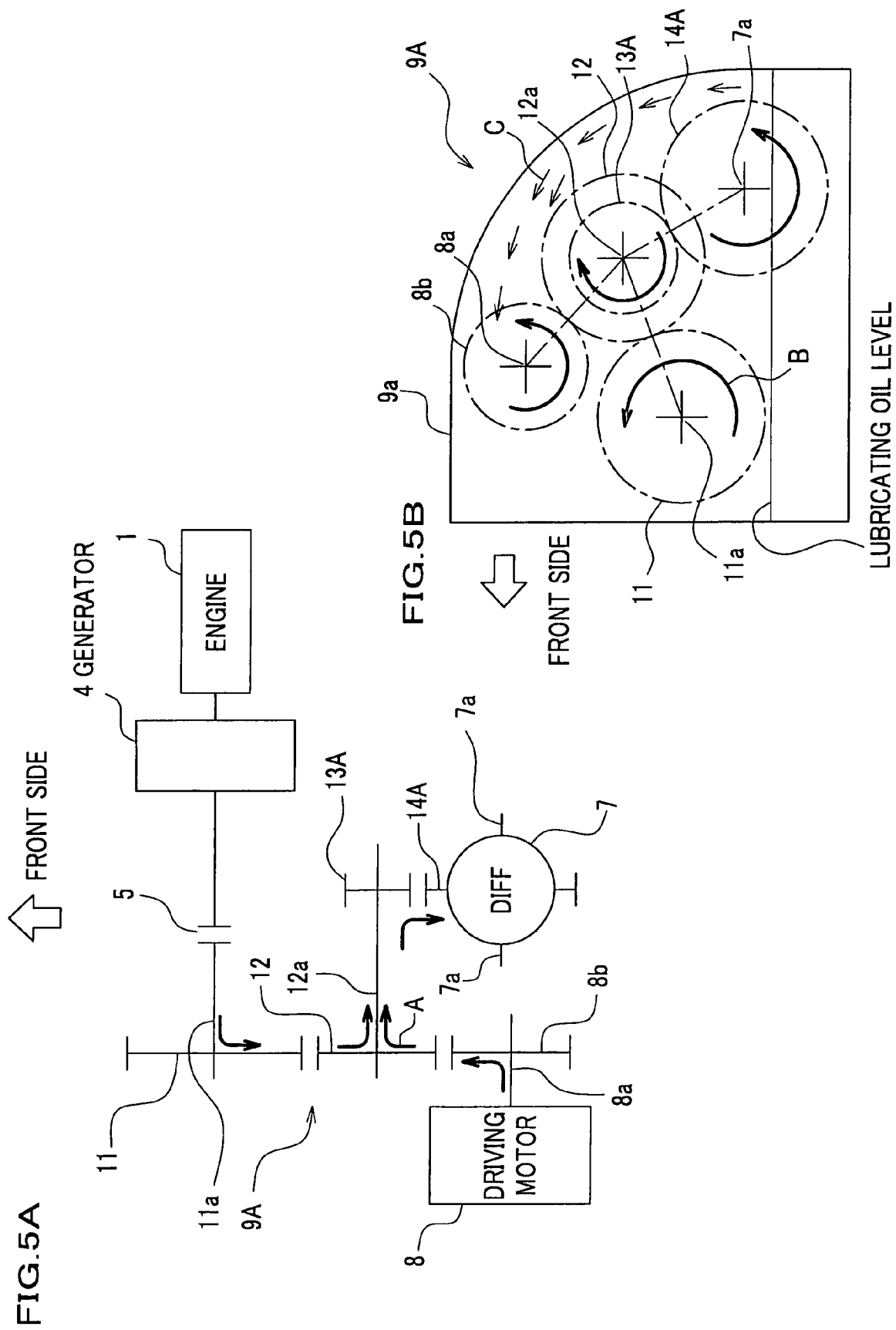

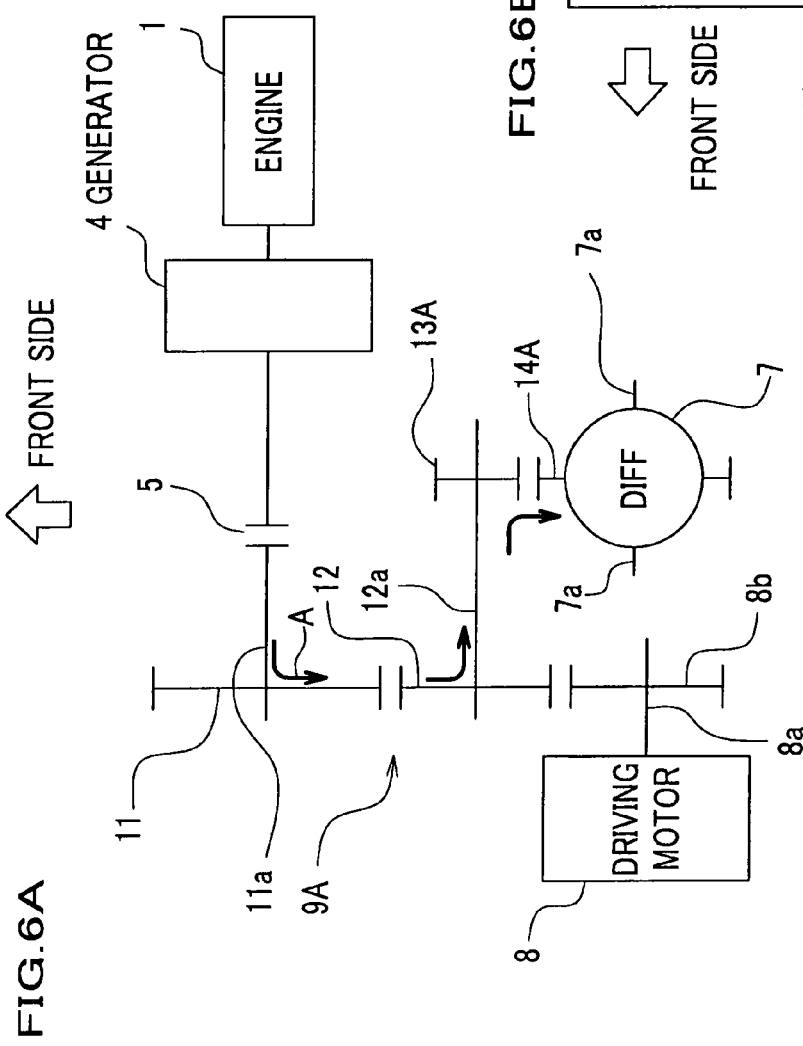
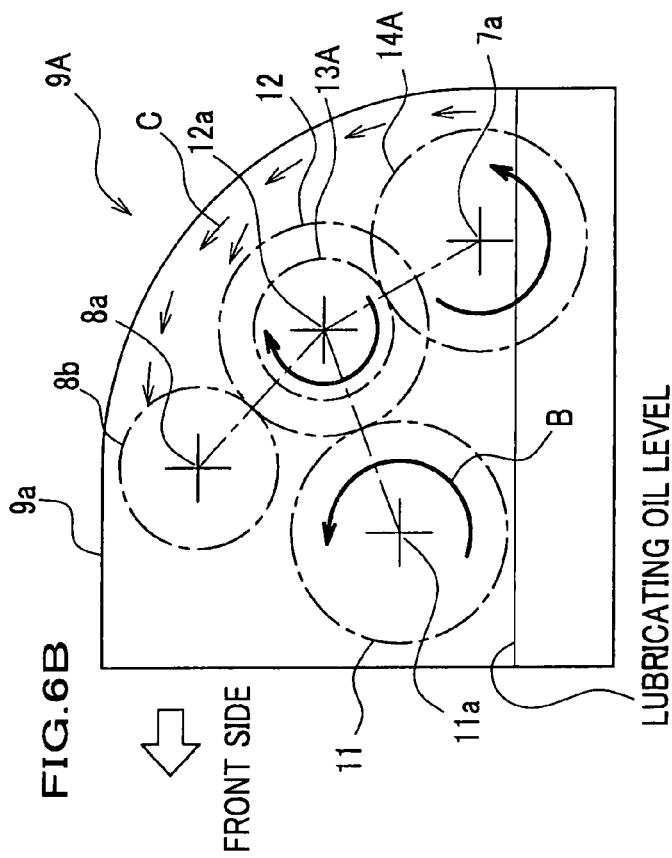

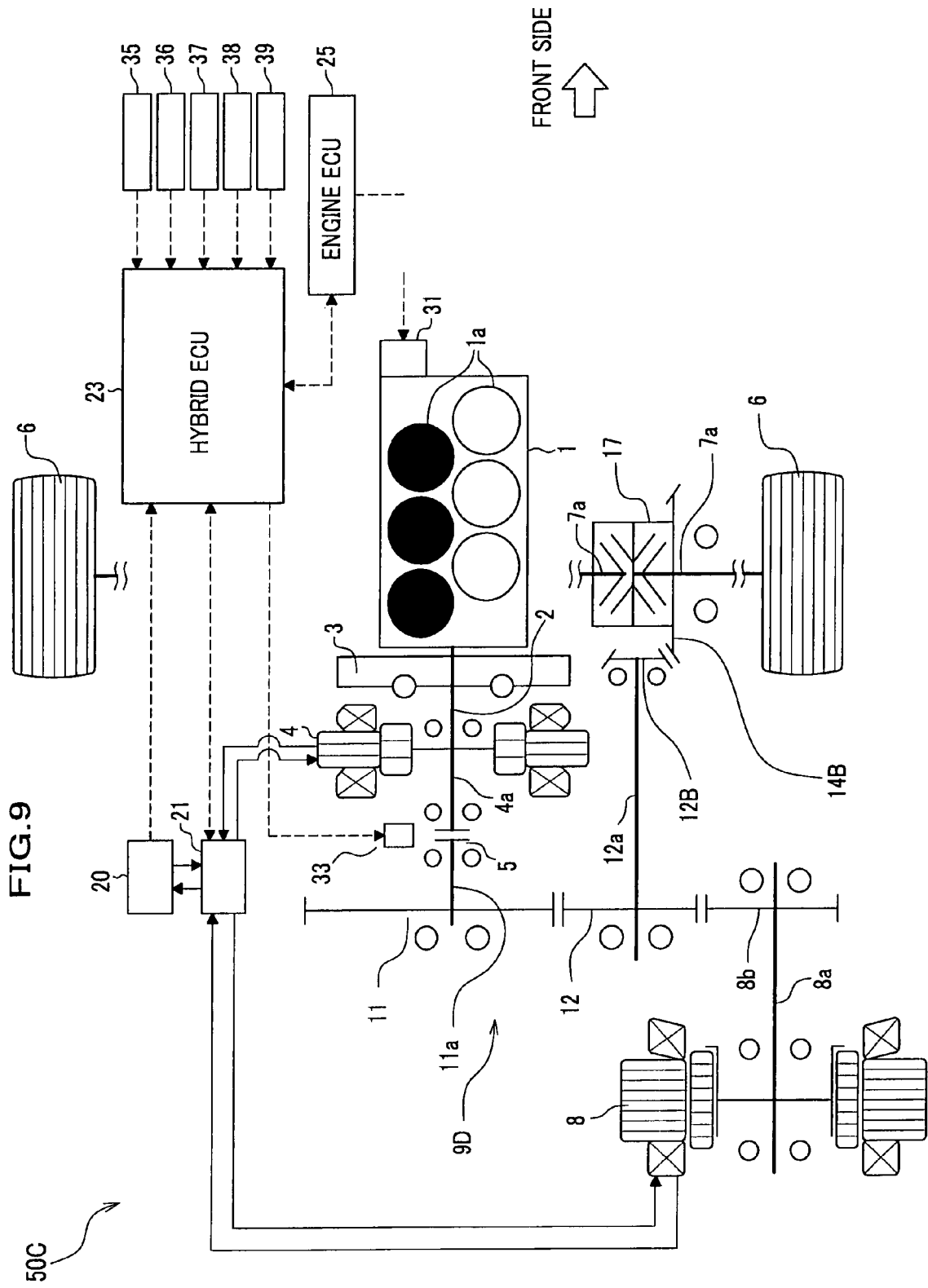

HYBRID VEHICLE

CROSS REFERENCE TO RELATED APPLICATIONS

This application claims the foreign priority benefit under Title 35, United States Code, §119(a)-(d) of Japanese Patent Application No. 2006-256272 filed on Sep. 21, 2006 in the Japan Patent Office, the disclosure of which is herein incorporated by reference in its entirety.

BACKGROUND OF THE INVENTION

The present invention relates to a hybrid vehicle which is driven by the combination of driving force of the engine (internal combustion engine) and driving force of the driving motor (electric motor), and more particularly to a hybrid vehicle having a first transmission passage for transmitting engine driving force to driving wheels and a second transmission passage for transmitting motor driving force to the driving wheels.

For example, Japanese Patent No. 2942533 (see paragraphs [0015] to [0028]; FIGS. 1 and 2), which is also referred to as Patent Reference 1, discloses a known hybrid vehicle using driving force characteristics of the engine and the driving motor. This hybrid vehicle runs in a vehicle speed range lower than a predetermined vehicle speed (vehicle speed $V_1$) by way of using a second transmission passage for transmitting the driving force of the driving motor to driving wheels, and runs in a vehicle speed range equal to or higher than the vehicle speed $V_1$ by way of using the second transmission passage and a first transmission passage for transmitting the engine driving force to the driving wheels. Further, in a vehicle speed range closer to the maximum vehicle speed $V_{max}$, the vehicle runs mainly by the first transmission passage for the engine. In this hybrid vehicle, the gear ratio of the first transmission passage is determined such that the maximum vehicle speed $V_{max}$ is achieved by driving force characteristics of the engine, and the second transmission passage and the first transmission passage are simple in structure without providing a variable gear ratio transmission. In the range around the maximum vehicle speed $V_{max}$, the vehicle runs with the engine driving force being transmitted to the driving wheels using the first transmission passage.

Japanese Laid-open Patent Application No. 2004-123060 (see FIGS. 1, 2, 7, and 10), which is also referred to as Patent Reference 2, discloses a structure employing a first transmission passage and a second transmission passage as above, in a FF (i.e., Front-engine Front-wheel drive type) vehicle with a longitudinally arranged engine.

For example, as shown in FIG. 11A (corresponding to FIG. 7(A) of Patent Reference 2), a transmission mechanism 101 includes an engine-side input shaft 118 that is connected to the engine 113, a motor-side input shaft 119 that is connected to the driving motor 114, and an idle shaft 120 that is parallel to these input shafts 118, 119 and connected to the front wheels. The engine-side input shaft 118, the motor-side input shaft 119, and the idle shaft 120 are housed in a transmission casing while they are facing in the driving direction of the vehicle.

A crank shaft 122 of the engine 113 is connected to a rotor of a generator 125, which is further connected to the engine-side input shaft 118. The engine 113 drives the generator 125 as well as the engine-side input shaft 118. The engine-side input shaft 118 includes a drive shaft 118a connected to the crank shaft 122, and a driven shaft 118b to which an engine-side drive gear 130 is fixed. A clutch mechanism 136 is provided between the drive shaft 118a and the driven shaft 118b.

Connected at the distal end of the motor shaft of the driving motor 114 is a motor-side input shaft 119. The distal end of the motor-side input shaft 119 is provided with a motor-side drive gear 131. In order to mesh with the engine-side drive gear 130 and the motor-side drive gear 131, the idle shaft 120 is provided with an engine-side idle gear 132 and a motor-side idle gear 133. Further, a pinion gear 134 as a final reduction pinion is provided at the distal end of the idle shaft 120, and a final gear 135 as a final reduction gear wheel is provided to mesh with the pinion gear 134. The final gear 135 is combined with deferential gears (not shown), so that the driving force transmitted from the engine-side input shaft 118 and the motor-side input shaft 119 to the idle shaft 120 is input to the final gear 135 and thereafter output to the right and left front drive shafts connected to the front wheels via the differential gears.

As shown in FIG. 11B (corresponding to FIG. 10(D) of Patent Reference 2), Patent Reference 2 discloses another embodiment of Patent Reference 2, in which a transmission mechanism 102 includes a clutch mechanism 136 that is built in between the engine-side idle gear 132 and the idle shaft 120.

As shown in FIG. 12A (corresponding to FIG. 10(A) of Patent Reference 2), a transmission mechanism 103 is also known, in which the driving motor 114 is arranged coaxially with the pinion gear 134 and further the idle shaft 120 and the motor-side input shaft 119 are also coaxially connected to the pinion gear 134 and the driving motor 114.

Also, as shown in FIG. 12B (corresponding to FIG. 10(B) of Patent Reference 2), a transmission mechanism 104 is known, in which the driving motor 114 is arranged coaxially with the engine 113 and further the engine-side input shaft 118 and the motor-side input shaft 119 are also coaxially connected to the engine 113 and the driving motor 114.

Further, as shown in FIG. 12C (corresponding to FIG. 10(C) of Patent Reference 2), a transmission mechanism 105 is known, in which the engine-side input shaft 118, the motor-side input shaft 119, and the idle shaft 120 are parallel to each other. The engine-side input shaft 118 is provided with a drive gear 184, and the motor-side input shaft 119 is provided with an intermediate gear 185 so as to mesh with the drive gear 184. In order to mesh with the intermediate gear 185, the idle shaft 120 is provided with an idle gear 186, so that the engine driving force and the motor driving force are transmitted to the idle shaft 120 via the idle gear 186.

According to the hybrid vehicle as disclosed in Patent Reference 1, when the vehicle runs or cruises in steady driving (cruise driving) requiring a low load, the vehicle runs in a series drive mode where the engine generates electricity and the driving motor drives the driving wheels, or alternatively, the vehicle runs by the engine driving force using the first transmission passage including a transmission mechanism having a relatively high reduction gear ratio (lowered gear ratio) that is set for realizing the maximum speed $V_{max}$ by the engine driving force.

However, the transmission efficiency of the driving force becomes relatively low in the series drive mode, and hence the fuel consumption of the vehicle may decrease accordingly. When the vehicle runs only by the engine driving force from the first transmission passage including the transmission mechanism having a lowered gear ratio, it is necessary for the vehicle to be driven with the lowered gear ratio that is set for realizing the driving force characteristics of the engine to achieve the maximum speed $V_{max}$. This results in a greater change in the engine speed in accordance with vehicle speed at a steady drive. When the vehicle runs in the steady drive mode, it is not possible to select an arbitrary engine speed range for achieving improved fuel economy, and hence the fuel consumption of the vehicle decreases as a result.

Especially in the combination of the engine driving force and the motor driving force of a hybrid vehicle equipped with a large displacement engine, an excessive driving force is large. The fuel consumption may therefore decrease remarkably in the first transmission passage including the transmission mechanism having the lowered gear ratio as described above. Further, even if an output characteristic variable mechanism such as variable cylinder management is combined with a large displacement multi-cylinder engine so as to achieve improved fuel economy, the setting of this lowered gear ratio is insufficient to achieve advantages of the output characteristic variable mechanism for controlling cylinder deactivation drive for improved fuel economy.

Further, according to the FF vehicle equipped with the longitudinally arranged engine as shown in FIGS. 1 and 2 of Patent Reference 2, the longitudinal length of the engine room generally becomes long, and hence the weight of the vehicle increases accordingly. As a result of this, it is difficult to adapt this arrangement to a compact vehicle.

According to the transmission mechanisms 101, 102 as shown in FIGS. 11A and 11B, the idle shaft 120 is provided with the engine-side idle gear 132 and the motor-side idle gear 133, respectively, to transmit driving force to the driving wheels. This results in an increased size of the entire transmission mechanism, increased weight, decreased fuel consumption efficiency, increased cost, etc. Moreover, as the size of the transmission mechanism increases, the mounting space for the generator and the driving motor is limited so that the power generation capacity of the generator and the driving force of the driving motor are limited accordingly.

According to the transmission mechanism 103 as shown in FIG. 12A, since the speed of the driving motor 114 is reduced only by the pinion gear 134 and the final gear 135, a sufficient reduction gear ratio is not obtained and it becomes difficult to achieve effective driving of the vehicle during operation of the motor 114. Further, the layout of the engine 113 and the engine-side input shaft 118, and the layout of the driving motor 114, the motor-side input shaft 119, and the idle shaft 120 are limited to the center distance between the engine-side input shaft 118 and the idle shaft 120, which leads to a decrease in design freedom upon arrangement of the components of the transmission mechanism. As a result, it may be difficult to realize a layout design which allows a transmission mechanism for hybrid vehicles to be also mounted in a space within the engine room of an existing non-hybrid vehicle.

Further, according to the transmission mechanism 104 as shown in FIG. 12B, since the reduction gear ratio for the engine 113 is the same as the reduction gear ratio for the driving motor 114, it is difficult to realize effective driving of the vehicle using the engine driving force and the motor driving force, respectively.

Further, according to the transmission mechanism 105 as shown in FIG. 12C, the first transmission passage for transmitting the driving force of the engine 113 to the driving wheels has a three-stage reduction gears, i.e., between the driving gear 184 and the intermediate gear 185, between the intermediate gear 185 and the idle gear 186, and between the pinion gear 134 and the final gear 135. When compared with other transmission mechanisms 101, 102, 103, 104 as shown in FIGS. 11A, 11B, 12A, and 12B, the transmission mechanism 105 requires one more gear transmission than the other transmission mechanisms, which leads to deteriorated transmission efficiency and thus deteriorated fuel consumption efficiency. Moreover, in the case of an FF vehicle equipped with a transversely arranged engine, generally, the engine rotation direction is the same as the rotation direction of the driving wheels. However, the transmission mechanism 105 as shown in FIG. 12C has one more gear transmission than the other transmission mechanism. Therefore, it is necessary to change the engine rotation direction between a hybrid vehicle and a non-hybrid vehicle, which leads to an increase in manufacturing cost of the hybrid vehicle.

In view of the above disadvantages, the present invention seeks to provide a hybrid vehicle equipped with a transmission mechanism which is small and light-weighted and excellent in transmission efficiency.

SUMMARY OF THE INVENTION

According to a first aspect of the present invention, there is provided a hybrid vehicle having a first transmission passage for transmitting driving force of an engine to driving wheels and a second transmission passage for transmitting driving force of a driving motor to the driving wheels, and driven by selectively using or in combination of the first transmission passage and the second transmission passage. The hybrid vehicle includes: a first input gear for inputting the driving force of the engine; a second input gear for inputting the driving force of the driving motor; and an idle gear meshed with the first input gear and the second input gear, and transmitting at least one of the driving force of the engine and the driving force of the driving motor toward the driving wheels. The driving force to be input from at least one of the first input gear and the second input gear is transmitted to the driving wheels via the idle gear and the final differential gears.

With this configuration of the hybrid vehicle, since the first input gear and the second input gear are meshed with one idle gear, the number of idle gears can be decreased when compared with the conventional hybrid vehicles. This enables the transmission mechanism for the first transmission passage and the second transmission passage to be small and light-weighted, thereby increasing design freedom upon arrangement of the components. Further, the reduction gear ratio for the first transmission passage and the reduction gear ratio for the second transmission passage can be set separately, so that the displacement of the engine and the capacity of the driving motor can be optimized based on an effective engine speed for the maximum driving force required for the engine or an effective motor speed for the maximum driving force required for the driving motor. The displacement of the engine and the capacity of the driving motor can be selected to achieve improved fuel consumption efficiency of the hybrid vehicle.

According to a second aspect of the present invention, there is provided a hybrid vehicle having a first transmission passage for transmitting driving force of an engine to driving wheels and a second transmission passage for transmitting driving force of a driving motor to the driving wheels, and driven by selectively using or in combination of the first transmission passage and the second transmission passage. The hybrid vehicle includes: a first input gear for inputting the driving force of the engine; a second input gear for inputting the driving force of the driving motor; an idle gear for transmitting at least one of the driving force of the engine and the driving force of the driving motor toward the driving wheels; and a chain or a belt meshed with the first input gear and the second input gear, and transmitting at least one of the driving force of the engine and the driving force of the driving motor to the idle gear. The driving force to be input from at least one of the first input gear and the second input gear is transmitted to the driving wheels via the idle gear and the final differential gears.

With this configuration of the hybrid vehicle, since the driving force from the first input gear and the driving force from the second input gear are transmitted to one idle gear via a chain or a belt, the number of idle gears can be decreased when compared with the conventional hybrid vehicles. This enables the transmission mechanism for the first transmission passage and the second transmission passage to be small and light-weighted, thereby increasing design freedom upon arrangement of the components. Further, the reduction gear ratio for the first transmission passage and the reduction gear ratio for the second transmission passage can be set separately, so that the displacement of the engine and the capacity of the driving motor can be optimized based on an effective engine speed for the maximum driving force required for the engine or an effective motor speed for the maximum driving force required for the driving motor. Therefore, the displacement of the engine and the capacity of the driving motor can be selected to achieve improved fuel consumption efficiency of the hybrid vehicle.

In the aforementioned hybrid vehicle according to the first aspect or the second aspect, a first reduction gear ratio of the first transmission passage may be set lower than a reduction gear ratio which enables the driving force of the engine alone to achieve the maximum vehicle speed of the vehicle, whereas a second reduction gear ratio of the second transmission passage may be set higher than the first reduction gear ratio such that the maximum vehicle speed is achieved by the driving force of the driving motor.

With this configuration of the hybrid vehicle, since the reduction gear ratio for the first transmission passage is set to such an extent that the engine driving force alone does not achieve the maximum vehicle speed, it is possible to drive the vehicle in an effective engine speed range where the combustion efficiency of the engine is improved, when the vehicle runs in steady driving at a normal vehicle speed lower than the maximum vehicle speed. The hybrid vehicle can therefore realize excellent fuel consumption efficiency during the steady driving. When the vehicle runs at the maximum vehicle speed, series driving is available in which the engine generates electricity to drive the driving motor.

In the aforementioned hybrid vehicle according to the first aspect or the second aspect, the first input gear, the second input gear, the idle gear, and the final differential gears may be housed in a transmission casing, into which lubricating oil is charged to provide a lubricant pool at a predetermined static liquid level, and the idle gear may be positioned above the predetermined static liquid level so as not to be submerged in and agitate the lubricant pool upon rotation of the idle gear.

With this configuration of the hybrid vehicle, the tooth surfaces of the idle gear driven by the first and second input gears and rotating at relatively high speeds do not agitate the lubricating oil. Therefore, it is possible to prevent deterioration in the transmission efficiency due to oil agitation resistance.

In the aforementioned hybrid vehicle, an idle shaft as an axis of the idle gear may be positioned above shafts of the final differential gears and a shaft of the first input gear.

With this configuration of the hybrid vehicle, the tooth surfaces of the idle gear driven by the first and second input gears and rotating at relatively high speeds do not agitate the lubricating oil, and only the tooth surfaces of the final differential gears whose rotation speed is the lowest are submerged in the lubricant pool to splash the lubricating oil over the other gears. Therefore, it is possible to prevent deterioration in the transmission efficiency due to oil agitation resistance.

In the aforementioned hybrid vehicle, a shaft of the second input gear may be positioned above the shaft of the first input gear and the shaft of the final differential gears.

With this configuration of the hybrid vehicle, the tooth surfaces of the second input gear whose rotation speed is the highest do not agitate the lubricating oil. Therefore, it is possible to prevent deterioration in the transmission efficiency due to oil agitation resistance. In this hybrid vehicle, the tooth surfaces of the second input gear and the idle gear, which rotate at relatively high speeds, are not submerged in the lubricant pool within the transmission casing, and the tooth surfaces of the final differential gears, which rotate at relatively low speeds, are submerged in the lubricant pool. Since the agitation resistance is small and the transmission efficiency is excellent, the hybrid vehicle achieves improved fuel consumption efficiency. Further, temperature rise of the lubricating oil can be prevented, and as a result, degradation of the lubricating oil is prevented as well.

In the aforementioned hybrid vehicle according to the first aspect or the second aspect, the driving motor may be positioned on the opposite side of the engine with respect to the idle gear.

With this configuration of the hybrid vehicle, the driving motor is positioned on the opposite side of the engine with respect to the idle gear, and as described above, the number of idle gears required for the hybrid vehicle is one. Therefore, the design freedom can be increased upon arrangement of the driving motor, and it is easy to increase the capacity of the driving motor. The mount capacity of the transmission mechanism on the vehicle can also be improved, and thus the transmission mechanism is easily mounted on a compact car.

In the aforementioned hybrid vehicle according to the first aspect or the second aspect, when the vehicle runs at the maximum vehicle speed, only the driving force of the driving motor may be transmitted to the driving wheels via the second transmission passage.

With this configuration of the hybrid vehicle, engine speed can be shifted to a high rotation speed range where the generator generates electricity required for high speed driving of the vehicle, so that the maximum vehicle speed is achieved in series drive mode using the generated electricity. In this hybrid vehicle, in order to achieve the maximum vehicle speed, the engine generates electricity and the driving motor is driven using the generated electric power.

Further, in the aforementioned hybrid vehicle according to the first aspect or the second aspect, the engine may be provided with an output characteristic variable mechanism for changing output characteristics.

If the hybrid vehicle is equipped with a large displacement engine and driven in combination of the engine driving force and the motor driving force, an excessive driving force is large in the steady driving. However, since the gear ratio for the first transmission passage is set higher than the conventional hybrid vehicles and the output characteristic variable mechanism can vary the output characteristics of the engine, the fuel consumption efficiency of the hybrid vehicle is remarkably improved when compared with the conventional hybrid vehicles.

In the aforementioned hybrid vehicle, the output characteristic variable mechanism may perform cylinder deactivation drive so as to disable part of cylinders of the engine during operation of the engine.

When the hybrid vehicle runs for example on a flat road surface, the engine has an excess driving force. Therefore, even if the output characteristic variable mechanism disables part of the cylinders of the engine, the hybrid vehicle is capable of running and allows steady driving with improved fuel efficiency.

According to this hybrid vehicle, the vehicle is provided with the output characteristic variable mechanism for the engine, and for example, when the vehicle runs in steady driving in a middle vehicle speed range, the output characteristic variable mechanism can disable part of the cylinders. Therefore, it is possible to keep the engine at effective engine speeds for achieving improved fuel consumption efficiency.

Furthermore, the output characteristic variable mechanism is allowed to combine, for example, valve opening and closing control, ignition timing control, and fuel injection control, other than the cylinder deactivation drive. As a result, the hybrid vehicle realizes more improved fuel consumption efficiency.

Other features and advantages of the present invention will be apparent from the following description taken in conjunction with the accompanying drawings.

BRIEF DESCRIPTION OF THE DRAWINGS

The aspects of the present invention will become more apparent by describing in detail illustrative, non-limiting embodiments thereof with reference to the accompanying drawings, in which:

FIG. 4A explains a driving force transmission passage in the series drive mode, and FIG. 4B explains how rotation driving force is transmitted between gears in the transmission casing during the series drive mode;

FIG. 5A explains a driving force transmission passage in the engine drive cruising mode, and FIG. 5B explains how rotation driving force is transmitted between gears in the transmission casing during the engine drive cruising mode;

FIG. 6A explains driving force transmission passages in the parallel drive mode, and FIG. 6B explains how rotation driving force is transmitted between gears in the transmission casing during the parallel drive mode;

FIG. 9 is a block diagram schematically illustrating the overall hybrid vehicle according a modified embodiment;

DETAILED DESCRIPTION OF THE INVENTION

First Embodiment

With reference to FIGS. 1 to 7, a hybrid vehicle according a first embodiment of the present invention will be described.

Figure 1:
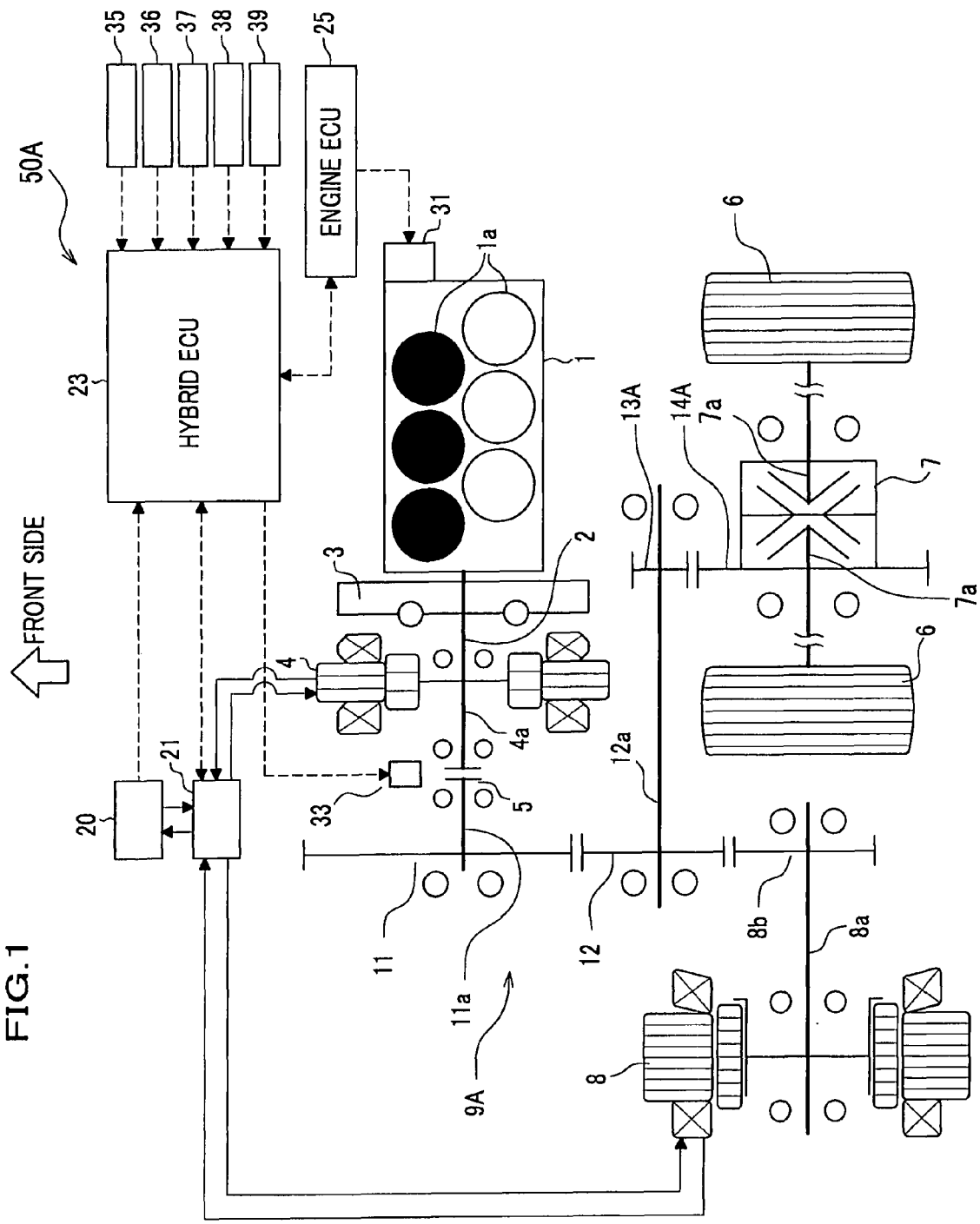
FIG. 1 is a block diagram schematically illustrating the overall hybrid vehicle according to a first embodiment.
Figure 2:
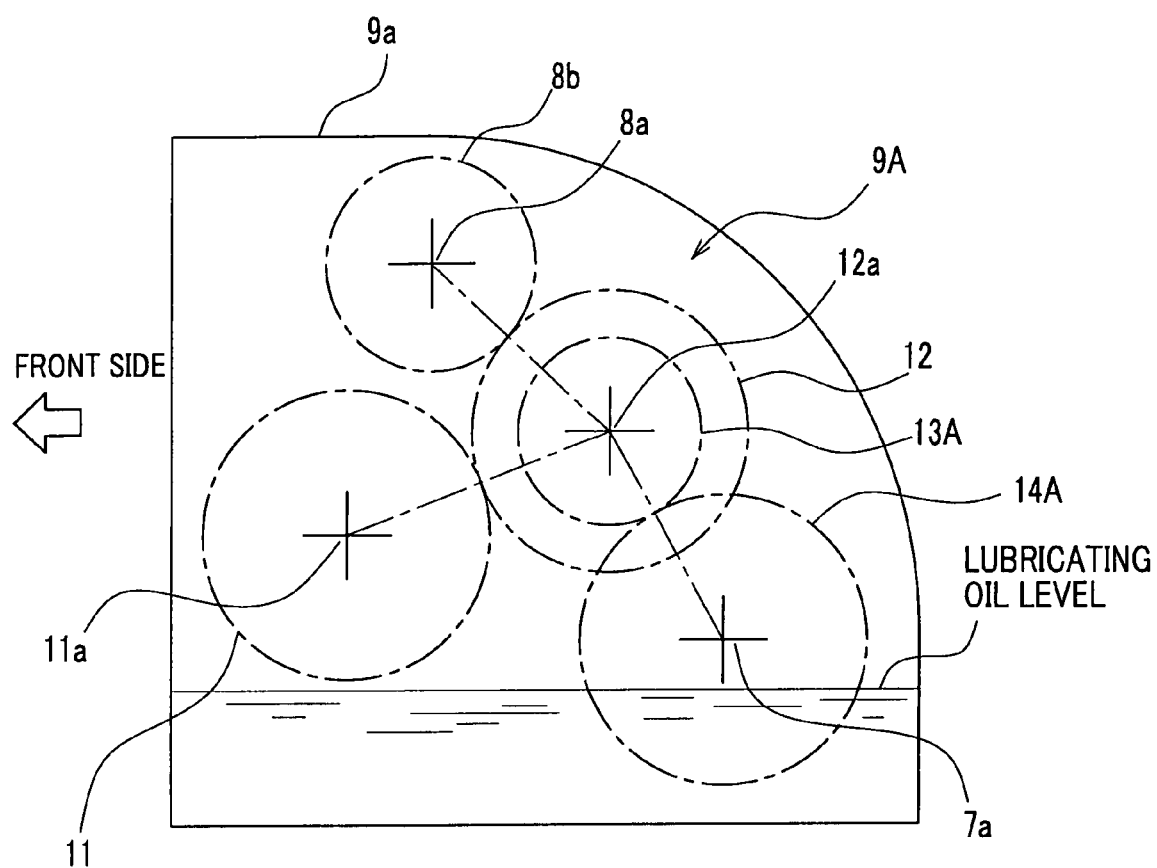
FIG. 2 shows arrangement of gear shafts viewing from the left side of the transmission mechanism according to the first embodiment.
Figure 3:
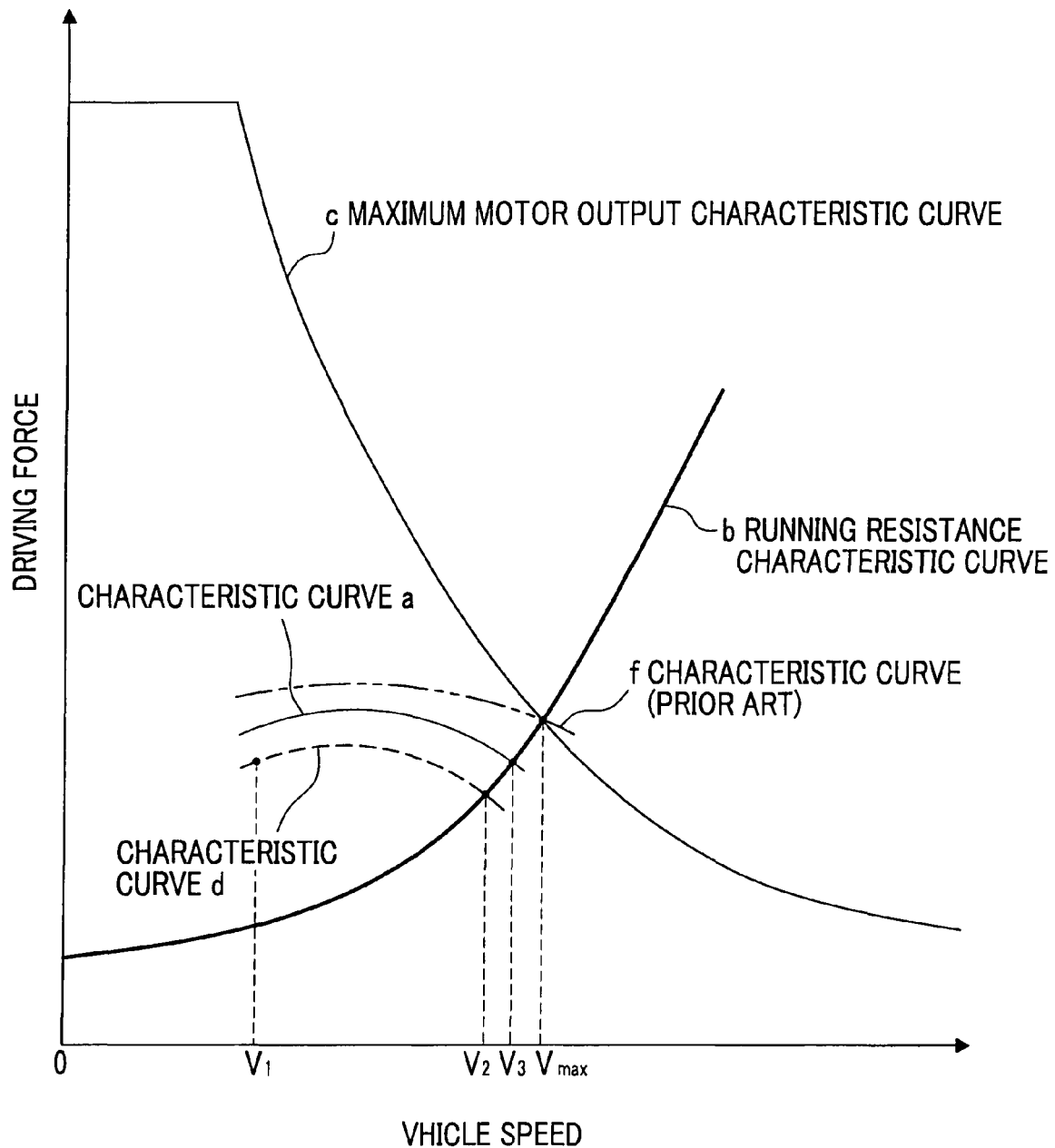
FIG. 3 is a graph showing driving force characteristics of the hybrid vehicle according to the first embodiment.

The overall arrangement of the hybrid vehicle 50A is schematically illustrated in FIG. 1, in which fixed gear type driving force transmission passages for an engine 1 and a driving motor 8 are provided. The transmission passages for transmitting engine driving force and motor driving force to driving wheels are provided by a transmission mechanism 9A. FIG. 2 shows an arrangement of gear shafts when viewing the transmission mechanism 9A from the left side of the vehicle. FIG. 3 is a graph showing driving force characteristics of the hybrid vehicle according to this embodiment, in which the horizontal axis indicates vehicle speed and the longitudinal axis indicates driving force or running resistance.

The hybrid vehicle 50A has a first transmission passage for transmitting driving force of the engine 1 to driving wheels 6, 6 to run the vehicle, and a second transmission passage for transmitting driving force of the driving motor 8 to the driving wheels 6, 6 to run the vehicle. The hybrid vehicle 50A is driven by selectively using or in combination of the first transmission passage and the second transmission passage.

Driving Force Transmission Passages

First transmission passage will be described below. As shown in FIG. 1, the engine 1 is a multi-cylinder engine with six cylinders for example. The engine 1 has a crank shaft 2, to which a rotor shaft 4a of a generator 4 which also functions as a self-starting motor is directly connected via a fly wheel 3. The rotor shaft 4a is further connected to a clutch 5 for transmitting driving force of the engine 1 to the driving wheels 6, 6. An engine output gear 11 is arranged at one end of a driven-side engine output shaft 11a which is connected to the clutch 5. The engine output gear 11 is meshed with an idle gear 12 which is arranged at one end of an idle shaft 12a. Arranged at the other end of the idle shaft 12a is a pinion gear 13A as a final reduction pinion. In order to mesh with the pinion gear 13A, a final gear 14A as a final reduction gear wheel is rotatably supported in a transmission casing (not shown). The final gear 14A is combined with differential gears 7 so that driving force transmitted to the idle shaft 12a is input to the final gear 14A and thereafter via the differential gears 7 output from right and left differential shafts 7a, 7a to the driving wheels (front wheels) 6, 6.

The pinion gear 13A, the final gear 14A, and the differential gears 7 form final differential gears defined in the claims.

The differential shafts 7a, 7a corresponds to shafts of the final differential gears defined in the claims.

The first transmission passage includes the crank shaft 2, the rotor shaft 4a, the clutch 5, the engine output shaft 11a to be connected or disconnected with the crank shaft 2 by the clutch 5, the engine output gear 11, the idle gear 12 to be meshed with the engine output gear 11, the pinion gear 13A coaxial with and synchronously driven with the idle gear 12 by the idle shaft 12a, the final gear 14A to be meshed with the pinion gear 13A, and the differential gears 7 for receiving driving force from the final gear 14A and transmitting the same to rotate the driving wheels 6, 6. Driving force of the engine 1 is transmitted to the driving wheels 6, 6 using the first transmission passage.

The first transmission passage has a fixed first reduction gear ratio, which is determined by the product obtained by multiplying a gear ratio between the engine output gear 11 and the idle gear 12 by a gear ratio between the pinion gear 13A and the final gear 14A.

Second transmission passage will be described below. As shown in FIG. 1, the driving motor 8 is driven by electric power supplied from a generator 4 or a battery 20 via an inverter 21. The driving motor 8 has a motor shaft 8a whose one end is directly connected to a motor gear 8b. The motor gear 8b is meshed with the idle gear 12.

The second transmission passage includes the motor gear 8b, the idle gear 12, the pinion gear 13A coaxial with and synchronously driven with the idle gear 12 by the idle shaft 12a, the final gear 14A to be meshed with the pinion gear 13A, and the differential gears 7 for receiving driving force from the final gear 14A and transmitting the same to rotate the driving wheels 6, 6. Driving force of the driving motor 8 is transmitted to the driving wheels 6, 6 using the second transmission passage.

The second transmission passage has a fixed second reduction gear ratio, which is determined by the product obtained by multiplying a gear ratio between the motor gear 8b and the idle gear 12 by a gear ratio between the pinion gear 13A and the final gear 14A.

The clutch 5, the engine output gear 11, the idle gear 12, the pinion gear 13A, the final gear 14A, the differential gears 7, the motor gear 8b, and each of the gear shafts form the transmission mechanism 9A.

With reference to FIG. 2, a transmission casing 9a for the transmission mechanism 9A will be described. As seen in FIG. 1, the hybrid vehicle 50A is an FF vehicle having a transversely arranged engine 1. Arranged on the extension of the crank shaft 2 are the rotor shaft 4a of the generator 4, the clutch 5, and the engine output shaft 11a. The idle shaft 12a is arranged behind the crank shaft 2 and its extension, and further the differential shaft 7a is arranged behind the idle shaft 12a. In FIG. 1, the motor shaft 8a is depicted behind the idle shaft 12a in terms of illustration in the figure. However, as seen in FIG. 2, the motor shaft 8a is actually positioned ahead of and above the idle shaft 12a. Further, the motor shaft 8a is positioned such that the motor gear 8b is meshed with the idle gear 12.

As best seen in FIG. 2, lubricating oil is charged at the bottom of the transmission casing 9a to provide a lubricant pool at a predetermined static liquid level. Within the transmission casing 9a, the engine output shaft 11a is positioned at the front side, and the idle shaft 12a is positioned behind and above the engine output gear 11. Further, the differential shaft 7a is positioned behind and below the idle shaft 12a such that the tooth surfaces of the final gear 14A are submerged in the lubricant pool.

In FIG. 1, a generator casing (not shown), by which a stator of the generator 4 is retained, is fixed to the right external surface of the transmission casing 9a integrally with a clutch casing (not shown) for the clutch 5. Similarly, a motor casing (not shown), by which a stator of the driving motor 8 is retained, is fixed to the left external surface of the transmission casing 9a. Therefore, the transmission mechanism 9A, the generator 4, and the driving motor 8 are compactly arranged. The clutch 5 may be built in the transmission casing 9a.

The clutch 5 may be of any known type, and for example, friction clutches disclosed in Patent Reference 2, such as an electromagnetic two-way clutch, an electromagnetic clutch using magnetic powder, a wet clutch, and a dry clutch are available. Alternatively, other mechanically meshing mechanism, such as a dog clutch, may be employed as the clutch 5.

Controller for Hybrid Vehicle

Description will be given on a controller for the hybrid vehicle, which controls driving conditions of the hybrid vehicle 50A.

As shown in FIG. 1, a hybrid ECU (Electric Control Unit) 23 is provided for controlling driving conditions of the hybrid vehicle 50A. The hybrid ECU 23 receives an ignition switch signal from an ignition switch 35, a shift position signal from a shift lever position sensor 36 provided in a shift lever (not shown), an accelerator pedal depression amount signal from an accelerator pedal position sensor 37 provided in an accelerator pedal (not shown), a brake pedal depression amount signal from a brake pedal position sensor 38 provided in a brake pedal (not shown), and a vehicle speed signal from a vehicle speed sensor 39 provided in a wheel.

Various sensors (not shown) are provided at the battery 20 for detecting output voltage, output current, and battery temperature. Sensor signals from these sensors are input into the hybrid ECU 23.

The hybrid ECU 23 controls an actuator 33 for connecting or disconnecting the clutch 5, based on the vehicle speed signal and in response to the accelerator pedal depression amount and the brake pedal depression amount.

Further, the hybrid ECU 23 controls via the inverter 21 the generator 4 which also functions as a self-starting motor and the driving motor 8 which can generate electricity. The hybrid ECU 23 also controls operation of the engine 1 via the engine ECU 25 for controlling an output characteristic variable mechanism 31, etc.

The hybrid ECU 23 is connected to the engine ECU 25 by a communication line. Other than control signals from the hybrid ECU 23, the engine ECU 25 receives the sift position signal, the accelerator pedal depression amount signal, the brake pedal depression amount signal, the vehicle speed signal, etc. The engine ECU 25 detects engine speed, etc. and outputs the same to the hybrid ECU 23 via the communication line.

The output characteristic variable mechanism 31 includes a mechanism for variable control for the valve lift amount and the opening and closing timing of the valves (not shown) provided in the cylinders 1a, 1a of the engine 1, a mechanism for performing variable cylinder management (cylinder deactivation drive) for disabling part of the cylinders 1a, 1a by way of restricting driving of the valves of these cylinders 1a, 1a, an electronic circuit for controlling ignition timing, and a mechanism and an electronic circuit for controlling fuel injection.

Setting for Reduction Gear Ratio

Description will be given on setting of a first reduction gear ratio of the transmission mechanism 9A.

The characteristic curve a of FIG. 3 shows driving force characteristics of the engine 1 nearly at the maximum output during steady driving of the hybrid vehicle 50A. In accordance with relations between engine speed at high vehicle speeds and engine torque, the first reduction gear ratio is set to a driving force level such that the driving force is lower than the running resistance characteristic curve b nearly at the maximum speed $V_{max}$ and it is allowed to speed up only to the vehicle speed $V_3$. In other words, the reduction gear ratio entirely including the engine output gear 11, the idle gear 12, the pinion gear 13A, and the final gear 14A is set to a high ratio in consideration of high speed cruising or low load so that the driving force of the engine 1 alone does not achieve the maximum speed $V_{max}$.

The running resistance characteristic curve b of FIG. 3 is obtained by adding rolling resistance of the driving wheels 6, 6 and other resistances such as air resistance, which increase in according with vehicle speed.

The characteristic curve d of FIG. 3 shows driving force characteristics of the engine 1 nearly at the maximum output of the engine 1 when the operation of the output characteristic variable mechanism 31 disables or rests three cylinders on one bank out of six cylinders of the engine 1 and operates the rest of the three cylinders so as to perform cylinder deactivation drive. The engine driving force is lowered as the result of this cylinder deactivation drive so that the engine driving force alone does not achieve the maximum speed $V_{max}$ and it is allowed to speed up only to the vehicle speed $V_2$ under the first reduction gear ratio.

The maximum output characteristic curve c of FIG. 3 shows the maximum output characteristics of the driving motor 8. The maximum output characteristic curve c for the driving motor 8 takes the maximum driving force at vehicle speeds from the start of the hybrid vehicle 50A to a predetermined low vehicle speed, and thereafter rapidly decreases as the vehicle speed increases, i.e., the motor speed increases. However, at a low vehicle speed range below and around the maximum speed $V_{max}$ of the hybrid vehicle 50A, the driving force characteristics of the driving motor 8 are set such that the maximum output characteristic values of the driving motor 8 are higher than the running resistance characteristic curve b and the maximum speed $V_{max}$ can be achieved by the driving motor 8 alone. In this instance, the reduction gear ratio entirely including motor gear 8b, the idle gear 12, the pinion gear 13A, and the final gear 14A is set to a low ratio in consideration of high load.

The reduction gear ratios of the first transmission passage and the second transmission passage are a reduction gear ratio for the entire transmission passage from the crank shaft 2 of the engine 1 to the driving wheels 6, 6 or from the motor shaft 8a of the driving motor 8 to the driving wheels 6, 6. Each of the reduction gear ratios between respective gears in the transmission passage may be set arbitrarily.

Switching Control for Transmission Passages

The hybrid ECU 23 switches between the first transmission passage and the second transmission passage in accordance with vehicle speed so as to drive the hybrid vehicle 50A.

To be more specific, when the hybrid vehicle 50A runs, for example, on an up slope or in the low vehicle speed range including the start of the vehicle and ranging from the vehicle speed of zero (0) to a vehicle speed lower than $V_1$, the hybrid ECU 23 controls the actuator 33 so as to disconnect the rotor shaft 4a and the engine output shaft 11a by the clutch 5, and then controls the inverter 21 so that the driving motor 8 drives the driving wheels 6, 6 via the second transmission passage. During this time, the driving motor 8 is driven by electric power from the battery 20. When the remaining charge amount of the battery 20 is low, the hybrid ECU 23 controls the inverter 21 and the engine ECU 25 so that the generator 4 functions as a self-starting motor and actuates the engine 1. The hybrid ECU 23 then controls the inverter 21 such that the engine 1 drives the generator 4 to generate electricity and the driving motor 8 is driven by the generated electricity (series drive mode).

The maximum output characteristics of the driving motor 8 are shown by the maximum output characteristic curve c of FIG. 3, in which the maximum driving force of the driving motor 8 exceeds the running resistance characteristic curve b until the vehicle speed reaches the maximum speed $V_{max}$. Therefore, the hybrid vehicle 50A can be driven in the low vehicle speed range as described above using the driving force of the driving motor 8.

In FIG. 4A, the arrows A show a transmission passage of the driving force in the series drive mode. Further, in FIG. 4B, the arrows B show rotation directions of the gear shafts for transmitting driving force, and the arrows C show the supply of lubricating oil to be splashed over the gears in the transmission casing 9a. As shown in FIG. 4B, upon rotation of the final gear 14A whose tooth surfaces are submerged in the lubricant pool, the final gear 14A agitates the lubricating oil and splashes the same over the idle gear 12, the pinion gear 13A, the motor gear 8b, and the engine output gear 11, thereby supplying the lubricating oil to the tooth surfaces of these gears.

In FIG. 3, during the steady drive of the hybrid vehicle 50A in the middle and high vehicle speed ranges from the vehicle speed V1 to a vehicle speed lower than V3, the hybrid ECU 23 controls the actuator 33 so as to connect the rotor shaft 4a and the engine output shaft 11a by the clutch 5. Meanwhile, the hybrid ECU 23 controls the inverter 21 so that the driving motor 8 is not actuated in principle. Therefore, only the driving force of the engine 1 is transmitted to the driving wheels 6, 6 via the first transmission passage (engine drive cruising mode; see FIGS. 5A and 5B). Driving force of the driving wheels 6, 6 in the engine drive cruising mode follows the characteristic curve a or the characteristic curve d of FIG. 3. In the case of cylinder deactivation drive, the hybrid vehicle 50A is allowed to speed up only to the vehicle speed $V_2$ in the range of the driving force exceeding the running resistance characteristic curve b. The engine ECU 25 controls the output characteristic variable mechanism 31 in accordance with the vehicle speed, the sift position signal, and the accelerator pedal depression amount signal, so as to switch between six-cylinder drive and three-cylinder drive and to perform the most improved fuel consumption efficiency. In this drive mode, vehicle speed of the hybrid vehicle 50A is determined by the engine speed. The driving motor 8 is idling in this drive mode.

In FIG. 5A, the arrows A show a transmission passage of the driving force in the engine drive cruising mode. Further, in FIG. 5B, the arrows B show rotation directions of the gear shafts for transmitting driving force, and the arrows C show the supply of lubricating oil to be splashed over the gears in the transmission casing 9a. As shown in FIG. 5B, upon rotation of the final gear 14A whose tooth surfaces are submerged in the lubricant pool, the final gear 14A agitates the lubricating oil and splashes the same over the idle gear 12, the pinion gear 13A, the motor gear 8b, and the engine output gear 11, thereby supplying the lubricating oil to the tooth surfaces of these gears.

In FIG. 3, during the acceleration of the hybrid vehicle 50A in the middle and high vehicle speed ranges from the vehicle speed $V_1$ to a vehicle speed lower than $V_3$, the hybrid ECU 23 controls the inverter 21 so that the driving motor 8 assists the engine driving force. On the contrary, during the deceleration of the hybrid vehicle 50A, the hybrid ECU 23 controls the inverter 21 so that the driving motor 8 regenerates electricity (parallel drive mode; see FIGS. 6A and 6B). In this drive mode, the driving motor 8 is capable of assisting the engine 1 for the charge amount of the battery 20. However, short-time acceleration is available in this drive mode. When the remaining charge amount of the battery 20 decreases, the hybrid ECU 23 controls the engine 1 via the engine ECU 25 so as to increase the engine driving force to the extent obtained by adding the engine driving force required for driving the hybrid vehicle 50A and the driving force required for actuating the generator 4, and then controls the inverter 21 so that the generator 4 generates electricity to charge the battery 20 to a proper battery charge amount.

In FIG. 6A, the arrows A show transmission passages of the engine driving force and the motor driving force in the parallel drive mode. Further, in FIG. 6B, the arrows B show rotation directions of the gear shafts for transmitting driving force, and the arrows C show the supply of lubricating oil to be splashed over the gears in the transmission casing 9a. As shown in FIG. 6B, upon rotation of the final gear 14A whose tooth surfaces are submerged in the lubricant pool, the final gear 14A agitates the lubricating oil and splashes the same over the idle gear 12, the pinion gear 13A, the motor gear 8b, and the engine output gear 11, thereby supplying the lubricating oil to the tooth surfaces of these gears.

When the hybrid vehicle 50A runs in the maximum vehicle speed range from a high vehicle speed $V_3$ to the maximum speed $V_{max}$, the hybrid ECU 23 controls the actuator 33 so as to disconnect the rotor shaft 4a and the engine output shaft 11a by the clutch 5. Meanwhile, the hybrid ECU 23 controls the inverter 21 such that the engine 1 drives the generator 4 to generate electricity. The driving motor 8 is driven by the generated electricity, and the motor driving force is transmitted to the driving wheels 6, 6 via the second transmission passage (series drive mode) and rotates the driving wheels 6, 6.

When the hybrid vehicle 50A runs in the maximum vehicle speed range, the rotation speed of the motor shaft 8a reaches the maximum rotation speed. In the vehicle speed range from the vehicle speed of zero to the maximum speed $V_{max}$, it is the motor shaft 8a that reaches the maximum rotation speed among the gear shafts. The gear shafts are arranged in the transmission casing 9a such that the tooth surfaces of the motor gear 8b provided on the motor shaft 8a are not submerged in the lubricant pool and that the tooth surfaces of the engine output gear 11 whose rotation speed reaches the second highest speed are not submerged in the lubricant pool as well.

Advantages of Hybrid Vehicle According to First Embodiment

According to the hybrid vehicle 50A, in the low vehicle speed range from the vehicle speed of zero to a vehicle speed lower than the predetermined vehicle speed $V_1$, the driving force is obtained from the driving motor 8, which can provide greater driving force than the engine 1, based on the maximum output characteristic curve c. Therefore, the hybrid vehicle 50A is capable of running in the low vehicle speed range with a sufficiently large driving force provided by the driving motor 8. This sufficient motor driving force is advantageous and applicable to other situations such as when the hybrid vehicle 50A runs on an up slope where an increased driving force is required. When the hybrid vehicle 50A speeds up and runs in steady driving in the middle and high vehicle speed ranges from the vehicle speed V1 to a vehicle speed lower than V3, the driving force of the engine 1 exceeds the running resistance characteristic curve b, so that the engine 1 alone can provide driving force which allows the hybrid vehicle 50A to run in these ranges.

In FIG. 3, the characteristic curve f shows the driving force characteristics of the engine 1 in the case where the reduction gear ratio of the first transmission passage is set to a low ratio, i.e., higher than the first reduction gear ratio according to the first embodiment, as disclosed in Patent Reference 1, such that the maximum speed $V_{max}$ can be attained only by the engine driving force. Referring to the characteristic curve a indicating the driving force characteristics of the engine 1 according to the first embodiment in which the reduction gear ratio of the first transmission passage is set to a high ratio, driving force becomes smaller than that of the characteristic curve f. Therefore, according to the first embodiment of the present invention, the engine 1 can be driven at low speed and high load against the same running resistance, which leads to improved fuel consumption efficiency comparing with the conventional hybrid vehicle disclosed in Patent Reference 1. Further, when the hybrid vehicle 50A runs on a flat road surface where no increased driving force is required, the driving force characteristics of the cylinder deactivation drive as shown by the characteristic curve d can afford the running of the hybrid vehicle 50A, thereby performing the steady driving with more improved fuel consumption efficiency.

Especially in the combination of the engine driving force and the motor driving force of the hybrid vehicle 50A equipped with a large displacement engine, a large excessive driving force is obtained during the steady driving. However, the gear ratio for the first transmission passage in the transmission mechanism 9A is set to a higher ratio than that of the conventional hybrid vehicle as described above. Therefore, the fuel consumption efficiency can be improved remarkably when compared with the conventional hybrid vehicle. Further, when the output characteristic variable mechanism 31 such as variable cylinder management for performing cylinder deactivation drive is combined with a large displacement multi-cylinder engine, if the output of the engine is lowered and the engine speed is set to perform more improved fuel consumption efficiency, it is possible to improve the fuel consumption efficiency.

In the maximum vehicle speed range from the vehicle speed $V_3$ to the maximum speed $V_{max}$, the crank shaft 2 positioned on the side of the engine 1 is disconnected from the engine output gear 11 by the clutch 5 so that only the driving force of the driving motor 8 is transmitted to the driving wheels 6, 6 (i.e., series drive mode). Therefore, the engine 1 speeds up to a high rotation speed range at which the generator 4 generates a necessary amount of electricity required for high speed running of the hybrid vehicle 50A, and the maximum speed $V_{max}$ can be achieved in the series drive mode using the thus generated electricity.

Figure 7:
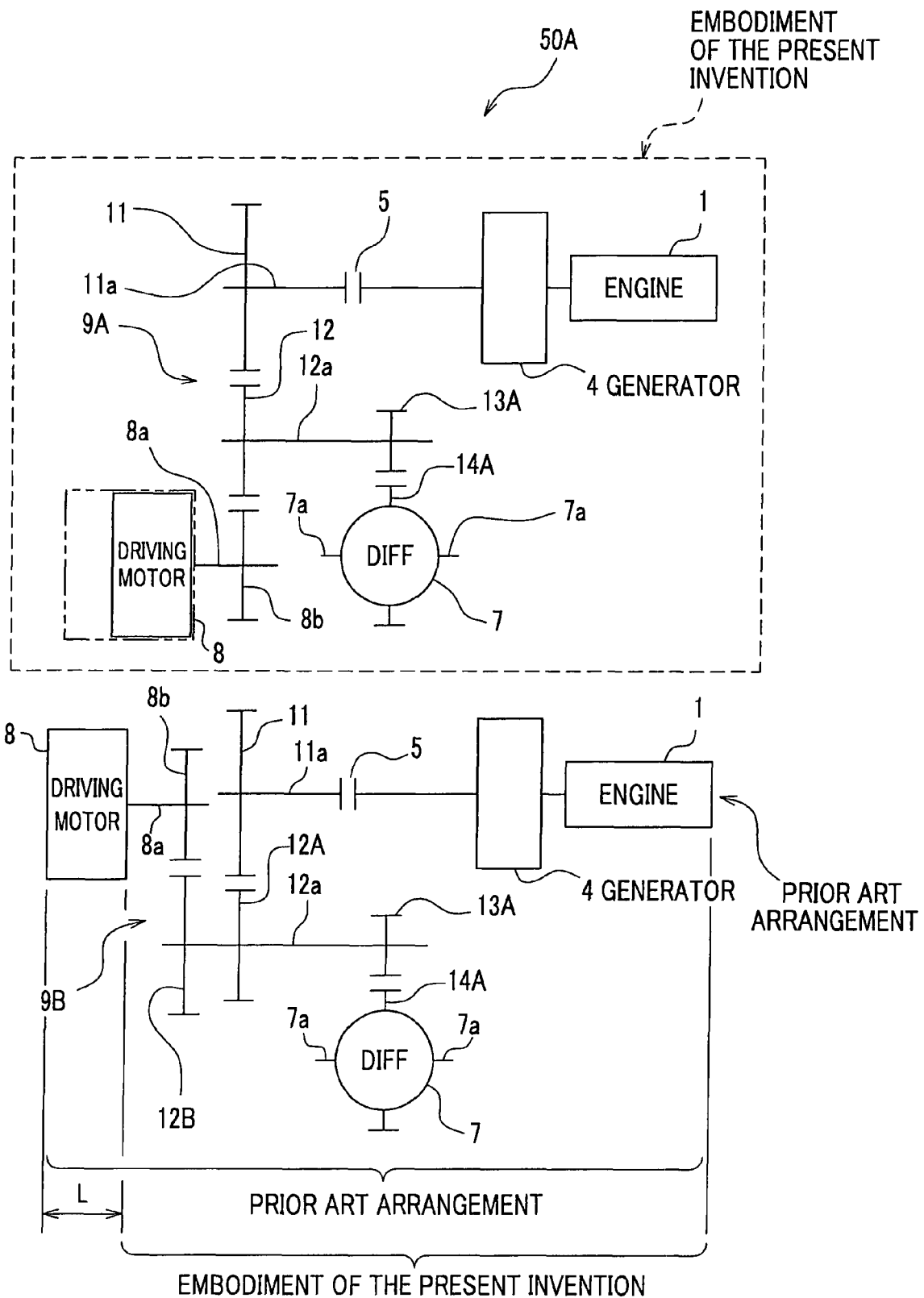
FIG. 7 compares the size of the power plant between the arrangement of the first embodiment and the arrangement of the conventional design.

As seen in FIG. 7, the size of the power plant according to this embodiment including the engine 1, the driving motor 8, the generator 4, the transmission mechanism 9A, etc. is compared with the conventional power plant as a comparative example including the driving motor 8, the generator 4, a conventional transmission mechanism 9B, etc. Referring to the conventional power plant illustrated outside and below the dotted lined frame and including the transmission mechanism 9B in which the engine output gear 11 and the motor gear 8b are respectively meshed with the idle gears 12A, 12B provided on the idle shaft 12a. Meanwhile, the transmission mechanism 9A according to this embodiment is configured such that the engine output shaft 11 and the motor gear 8b are meshed with the common single idle gear 12. Therefore, the number of parts of the transmission mechanism can be decreased, and the mounting space corresponding to the distance L can be saved as a result.

As shown by the phantom line of FIG. 7, the driving motor 8 can be replaced with a large output motor 8 so as to enhance the driving force in the series drive mode.

Further, since only one idle gear is required, it is possible to provide a small and light-weighted transmission mechanism 9A, which can decrease the size and cost of the hybrid vehicle 50A.

Figure 12A:
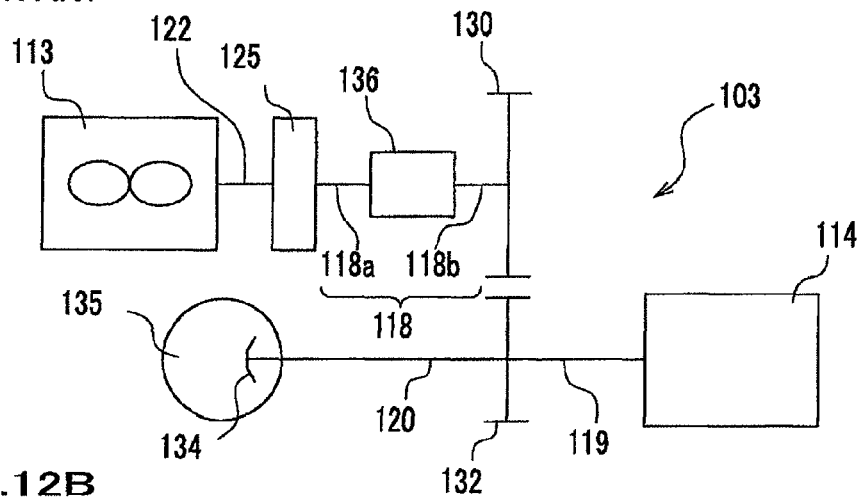
FIGS. 12A to 12C schematically show conventional transmission mechanisms.
Figure 12B:
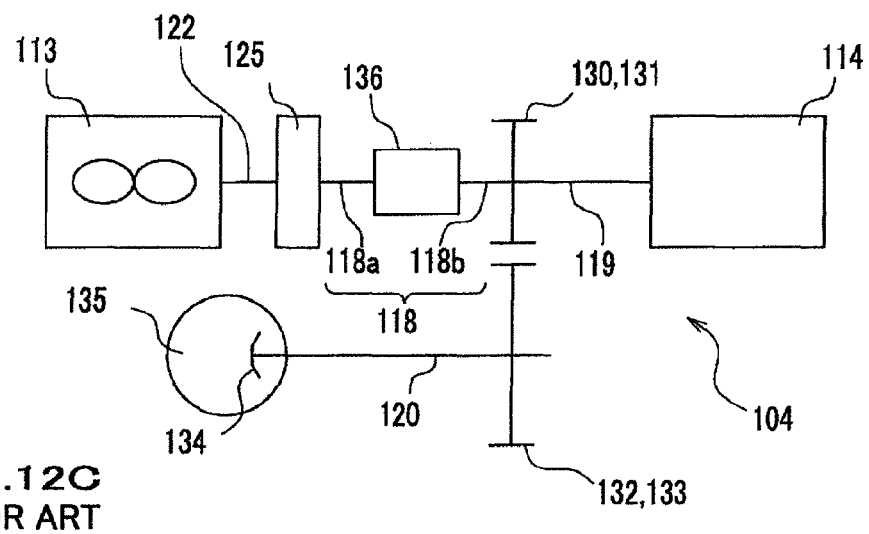
Figure 12C:
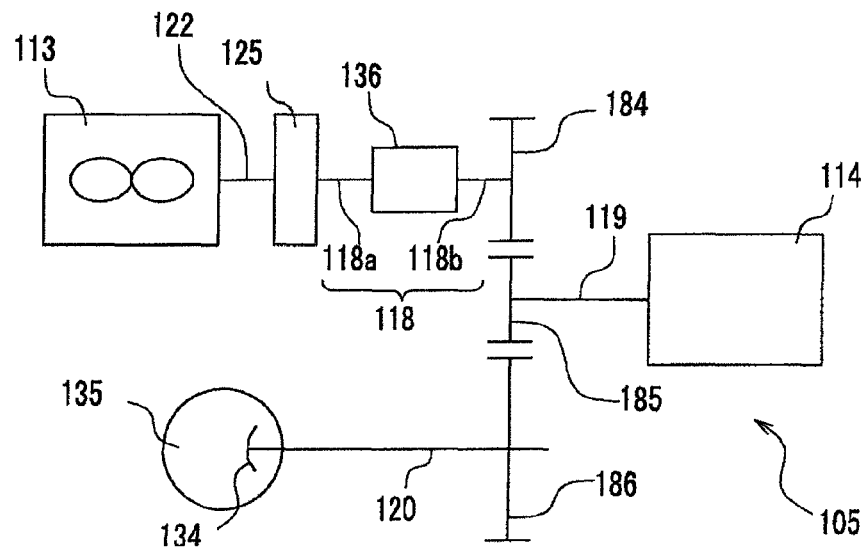

Since the size of the transmission mechanism 9A is decreased, it is possible to increase design freedom upon arrangement of gears of the transmission mechanism 9A and the driving motor 8. Further, when compared with the conventional transmission mechanism as shown in FIG. 12C, the transmission mechanism 9A according to this embodiment requires one less gear meshing engagement in the first transmission passage, which leads to improvement in transmission efficiency and fuel consumption efficiency.

According to this embodiment, the reduction gear ratio for the first transmission passage and the reduction gear ratio for the second transmission passage can be set separately, so that the displacement of the engine and the capacity of the driving motor can be optimized based on an effective engine speed for the maximum driving force required for the engine or an effective motor speed for the maximum driving force required for the driving motor. As a result, it is possible to provide the engine 1 and the driving motor 8, which can improve efficiency more than those disclosed in Patent References 1 and 2. This can also contribute to reduced size of the engine 1, reduced size of the driving motor 8, reduced weight of the vehicle, improved fuel consumption efficiency, and reduced cost.

Further, since the transmission mechanism 9A becomes small and light-weighted, the design freedom is increased upon arrangement of parts in the engine room and the transmission mechanism 9A is also applicable for a power plant of other vehicle types. If the capacity of the generator 4 or the driving motor 8 is increased using the excess space, it is possible to improve the driving performance or the assisting performance of the hybrid vehicle 50A to thereby improve the fuel consumption efficiency.

According to this embodiment, the gears in the transmission casing 9a are arranged such that the motor shaft 8a whose rotation speed is the highest is positioned at the uppermost position, the idle shaft 12a whose rotation speed is relatively high is positioned below the motor shaft 8a, the engine output shaft 11a is positioned below the idle shaft 12a, and the differential shaft 7a is positioned below the engine output shaft 11a at the lowermost position. Since the tooth surfaces of the motor gear 8b whose rotation speed is the highest and the tooth surfaces of the idle gear 12 whose rotation speed is relatively high are not submerged in the lubricant pool, it is possible to prevent decrease in the transmission efficiency of the driving force due to oil agitation resistance, acceleration in degradation of the lubricating oil due to elevated temperature of the lubricating oil, and deterioration of the fuel consumption efficiency.

Further, unlike the transmission mechanism 105 as shown in FIG. 12C, there is no need to change the engine rotation direction to the reverse direction of the non-hybrid vehicle engine. This makes it possible to adapt the non-hybrid vehicle engine to a hybrid vehicle without any modifications, and therefore, it is not necessary to develop a new counter-rotating engine.

According to this embodiment, since the hybrid vehicle 50A is an FF vehicle with a transversely arranged engine, it is possible to reduce the size of the engine room and hence to reduce the weight of the vehicle.

On the contrary, instead of reducing the size of the transmission mechanism 9A, clearance in the engine room may be increased upon arrangement of equipments so as to improve impact absorption effect for a front collision of the hybrid vehicle 50A.

When a light car or a compact car is hybridized, the transmission mechanism 9A according to this embodiment can be easily mounted thereon. The transmission mechanism 9A is applicable to other types of vehicles other than FF vehicles. For example, the transmission mechanism 9A is applicable to a midship engine vehicle, and the transmission mechanism 9A can be mounted on a rear side of the vehicle or under the floor (under the rear cabin) of the vehicle body.

Second Embodiment

Figure 8A:
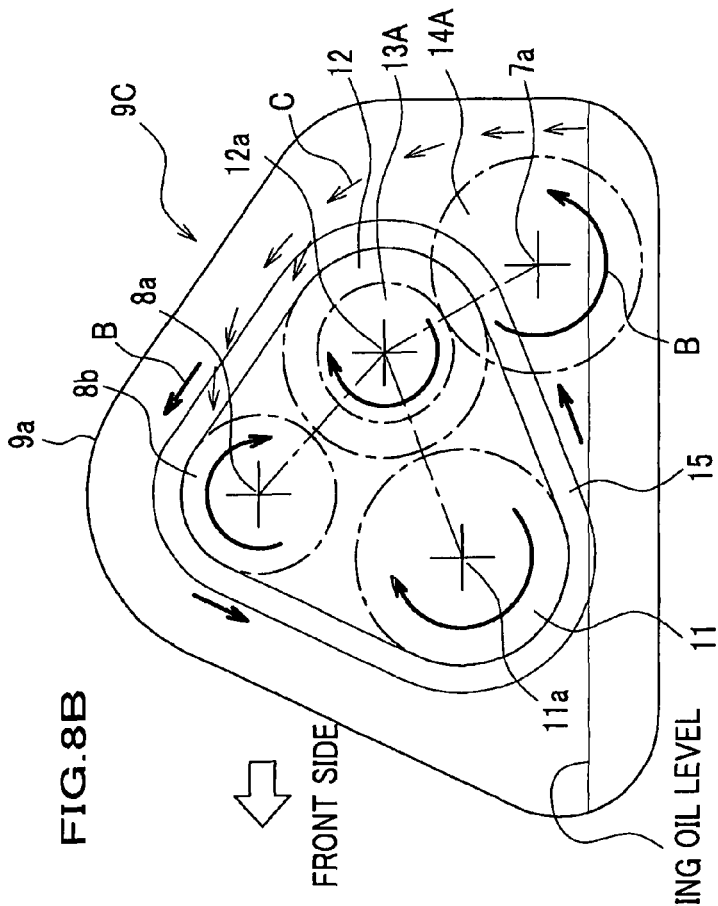
FIGS. 8A and 8B schematically explain the overall hybrid vehicle according to a second embodiment.
Figure 8B:
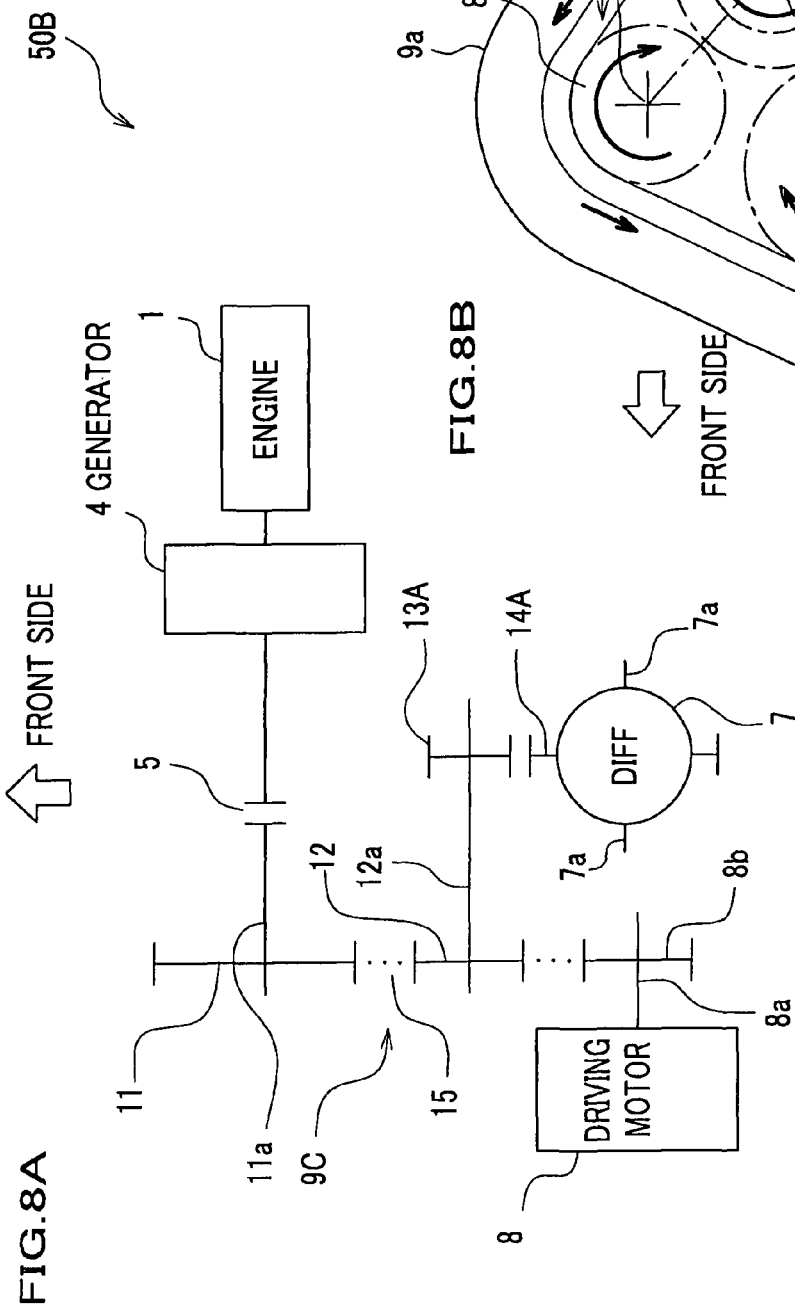

With reference to FIG. 8, a hybrid vehicle 50B according to a second embodiment of the present invention will be described. The hybrid vehicle 50B is substantially the same as the hybrid vehicle 50A according to the first embodiment. However, in this hybrid vehicle 50B, a transmission mechanism 9C is configured such that the engine output gear 11, the idle gear 12, and the motor gear 8b are engaged with a single chain 15 to form a triangular loop and the driving force of the engine 1 and the driving force of the driving motor 8 are transmitted to the idle gear 12 via the chain 15. Parts similar to those previously described with reference to the first embodiment are denoted by the same reference numerals, and detailed description thereof will be omitted. As with the first embodiment, the chain 15 is housed in the transmission casing 9a, into which lubricating oil is charged for cooling and lubricating purposes.

In this hybrid vehicle 50B according to this second embodiment, the same advantages can be obtained with the hybrid vehicle 50A according to the first embodiment. To be more specific, when the hybrid vehicle 50B runs in steady driving in the middle and high vehicle speed ranges from the vehicle speed $V_1$ to a vehicle speed lower than $V_3$ based on the driving force characteristics as shown in FIG. 3, the hybrid vehicle 50B runs in the engine drive cruising mode so as to perform effective fuel consumption efficiency. Further, since the driving force of the engine 1 and the driving force of the driving motor 8 can be transmitted to the common single idle gear 12 of the transmission mechanism 9C via the chain 15, the number of parts of the transmission mechanism 9C can be decreased when compared with the conventional transmission mechanism. As a result, since the width of the vehicle can be decreased, it is possible to increase the capacity of the driving motor 8 or to increase the design freedom of the parts arrangement using the excess space. Further, among the gears of the transmission mechanism 9C, the motor shaft 8a whose rotation speed is the highest is positioned upward in the transmission casing 9a so that the tooth surfaces of the motor gear 8b are not submerged in the lubricant pool. This can improve the transmission efficiency.

Reducing the size of the transmission mechanism 9C and improving the transmission efficiency contribute to improvement in the fuel consumption efficiency of the hybrid vehicle 50B.

In this second embodiment, the engine output gear 11, the motor gear 8b, and the idle gear 12 may be replaced with pulleys, and the chain 15 may be replaced with a metallic belt for belt-type CVT (Continuously Variable Transmission).

While the hybrid vehicle according to the present invention has been described in detail with reference to the preferred embodiments thereof, the present invention is not limited to these specific embodiments and various changes and modifications may be made without departing from the scope of the attached claims.

According to the first and second embodiments, the present invention has been described as being applied to an FF hybrid vehicle with a transversely arranged engine. However, the present invention is not limited to this specific vehicle. The present invention is applicable to both an FF hybrid vehicle with a longitudinally arranged engine as shown in FIG. 9 and an FR hybrid vehicle with a longitudinally arranged engine as shown in FIG. 10.

In the case of the FF hybrid vehicle 50C with a longitudinally arranged engine, as shown in FIG. 9, the transmission mechanism 9D is configured such that driving force is transmitted between the pinion gear 12B and the final gear 14B with the direction of transmission converted by 90 degrees. For this reason, the hybrid vehicle 50C employs a hypoid gear for example.

Figure 10:
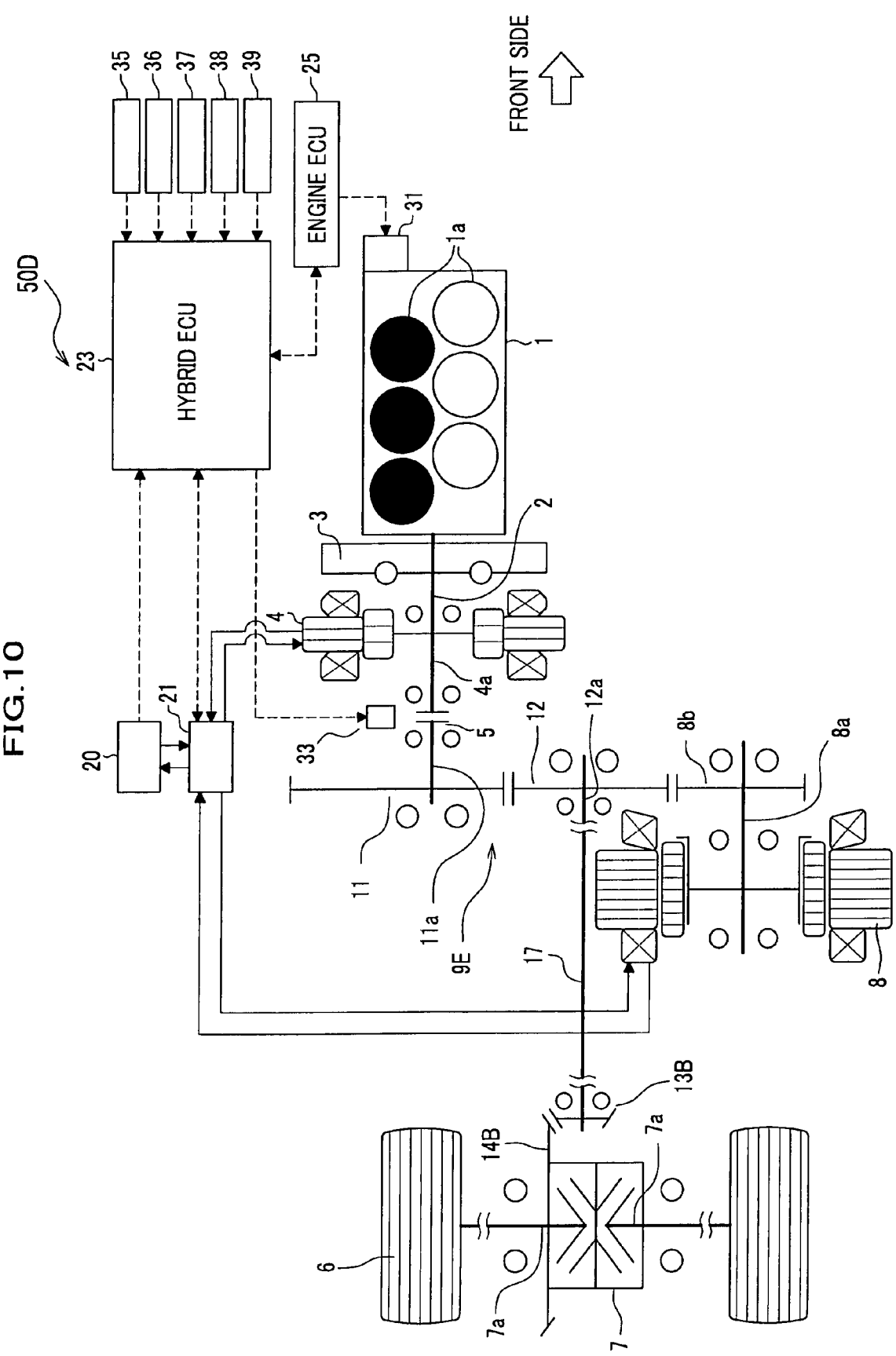
FIG. 10 is a block diagram schematically illustrating the overall hybrid vehicle according to another modified embodiment.
Figure 11A:
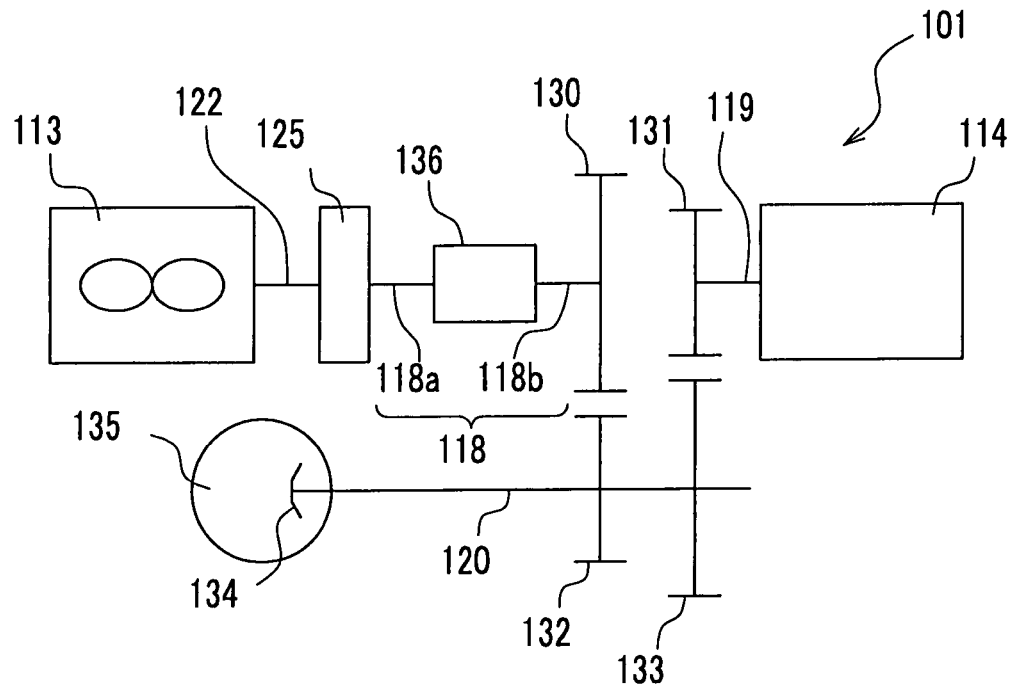
FIG. 11A schematically shows a conventional transmission mechanism for a hybrid vehicle, and FIG. 11B also schematically shows a conventional transmission mechanism for a hybrid vehicle.
Figure 11B:
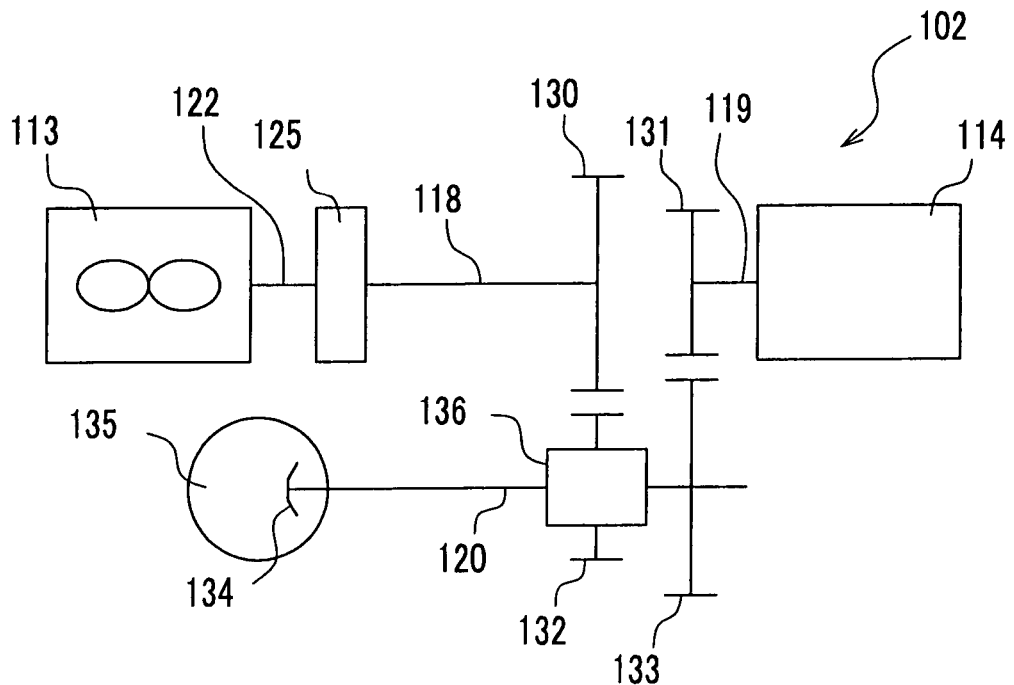

In the case of the FR hybrid vehicle 50D with a longitudinally arranged engine, as shown in FIG. 10, the transmission mechanism 9E is configured such that the idle shaft 12a whose one end protrudes from the transmission casing (not shown) is connected with a propeller shaft 17 via a constant velocity joint (not shown) and the driving force is transmitted, for example, to a pinion gear 13B as a hypoid gear and the final gear 14B.

In these modified embodiments as shown in FIGS. 9 and 10, the idle gear 12 is meshed with the engine output gear 11 and the motor gear 8b, and the number of idle gears required for these hybrid vehicles 50C, 50D is smaller by one, so that the transmission casings (not shown) for the transmission mechanisms 9D, 9E as shown in FIGS. 9 and 10 can be small-sized. Further, the hybrid vehicle 50C as shown in FIG. 9 is configured such that the tooth surfaces of the final gear 14B are submerged in the lubricant pool in the transmission casing as with the first embodiment and the motor shaft 8a is positioned upward in the transmission casing. Since the motor gear 8b whose rotation speed is the highest is not submerged in the lubricant pool, it is possible to prevent the motor gear 8b from agitating the lubricating oil, thereby providing the transmission mechanism 9D with improved transmission efficiency.

In the case of the hybrid vehicle 50D as shown in FIG. 10, the pinion gear 13B and the final gear 14B are housed in the casing for the differential gears. Therefore, if the tooth surfaces of the idle gear 12 are submerged in the lubricant pool at the bottom of the transmission casing and the motor shaft 8a is positioned upward in the transmission casing, it is possible to prevent the motor gear 8b from agitating the lubricating oil, thereby providing the transmission mechanism 9E with improved transmission efficiency.

What is claimed is:

1. A hybrid vehicle having a first transmission passage for transmitting driving of an engine to driving wheels and a second transmission passage for transmitting driving force of a driving motor to the driving wheels, and driven by selectively using or in combination of the first transmission passage and the second transmission passage based at least on a vehicle speed wherein a first reduction gear ratio of the first transmission passage is set to be a fixed value which is lower than a reduction gear ratio at which the maximum vehicle speed of the vehicle is achieved by the driving force of the engine alone so that the maximum vehicle speed is not achieved by the driving force of the engine alone, and the maximum vehicle speed is achieved by the second transmission passage which a reduction gear ratio is fixed at a second reduction gear ratio, the hybrid vehicle comprising:

a first input gear for inputting the driving force of the engine;

a second input gear for inputting the driving force of the driving motor; and an idle gear meshed with the first input gear and the second input gear, and transmitting at least one of the driving force of the engine and the driving force of the driving motor toward the driving wheels, wherein the driving force to be input from at least one of the first input gear and the second input gear is transmitted to the driving wheels via the idle gear and the final differential gears.

2. A hybrid vehicle having a first transmission passage for transmitting driving force of an engine to driving wheels and a second transmission passage for transmitting driving force of a driving motor to the driving wheels, and driven by selectively using or in combination of the first transmission passage and the second transmission passage based at least on a vehicle speed wherein a first reduction gear ratio of the first transmission passage is set to be a fixed value which is lower than a reduction gear ratio at which the maximum vehicle speed of the vehicle is achieved by the driving force of the engine alone so that the maximum vehicle speed is not achieved by the driving force of the engine alone, and the maximum vehicle speed is achieved by the second transmission passage of which a reduction gear ratio is fixed at a second reduction gear ratio, the hybrid vehicle comprising:

a first input gear for inputting the driving force of the engine;

a second input gear for inputting the driving force of the driving motor;

an idle gear for transmitting at least one of the driving force of the engine and the driving force of the driving motor toward the driving wheels; and a chain or a belt meshed with the first input gear and the second input gear, and transmitting at least one of the driving force of the engine and the driving force of the driving motor to the idle gear, wherein the driving force to be input from at least one of the first input gear and the second input gear is transmitted to the driving wheels via the idle gear and the final differential gears.

3. A hybrid vehicle according to claim 1, wherein the second reduction gear ratio of the second transmission passage is set higher than the first reduction gear ration such that the maximum vehicle speed is achieved by the driving force of the driving motor.

4. A hybrid vehicle according to claim 1, wherein the first input gear, the second input gear, the idle gear, and the final differential gears are housed in a transmission casing, into which lubricating oil is charged to provide a lubricant pool at a predetermined static liquid level, and wherein the idle gear is positioned above the predetermined static liquid level so as not to be submerged in and agitate the lubricant pool upon rotation of the idle gear.

5. A hybrid vehicle according to claim 1, wherein an idle shaft as an axis of the idle gear is positioned above shafts of the final differential gears and a shaft of the first input gear.

6. A hybrid vehicle according to claim 1, wherein a shaft of the second input gear is positioned above a shaft of the first input gear and shafts of the final differential gears.

7. A hybrid vehicle according to claim 1, wherein the driving motor is positioned on the opposite side of the engine with respect to the idle gear.

8. A hybrid vehicle according to claim 1, wherein when the vehicle runs at the maximum vehicle speed, only the driving force of the driving motor is transmitted to the driving wheels via the second transmission passage.

9. A hybrid vehicle according to claim 1, wherein the engine is provided with an output characteristic variable mechanism for changing output characteristics.

10. A hybrid vehicle according to claim 9, wherein the output characteristic variable mechanism performs cylinder deactivation drive so as to disable part of cylinders of the engine during operation of the engine.

11. A hybrid vehicle according to claim 2, wherein the second reduction gear ratio of the second transmission passage is set higher than the first reduction gear ratio such that the maximum vehicle speed is achieved by the driving force of the driving motor.

12. A hybrid vehicle according to claim 2, wherein the first input gear, the second input gear, the idle gear, and the final differential gears are housed in a transmission casing, into which lubricating oil is charged to provide a lubricant pool at a predetermined static liquid level, and wherein the idle gear is positioned above the predetermined static liquid level so as not to be submerged in and agitate the lubricant pool upon rotation of the idle gear.

13. A hybrid vehicle according to claim 2, wherein an idle shaft as an axis of the idle gear is positioned above shafts of the final differential gears and a shaft of the first input gear.

14. A hybrid vehicle according to claim 2, wherein a shaft of the second input gear is positioned above a shaft of the first input gear and shafts of the final differential gears.

15. A hybrid vehicle according to claim 2, wherein the driving motor is positioned on the opposite side of the engine with respect to the idle gear.

16. A hybrid vehicle according to claim 2, wherein when the vehicle runs at the maximum vehicle speed, only the driving force of the driving motor is transmitted to the driving wheels via the second transmission passage.

17. A hybrid vehicle according to claim 2, wherein the engine is provided with an output characteristic variable mechanism for changing output characteristics.

18. A hybrid vehicle according to claim 17, wherein the output characteristic variable mechanism performs cylinder deactivation drive so as to disable part of cylinders of the engine during operation of the engine.

* * * * *